United States Patent
Mueller et al.

(10) Patent No.: US 6,567,743 B1
(45) Date of Patent: May 20, 2003

(54) METHOD AND DEVICE FOR DETERMINING A ROUTE FROM A STARTING LOCATION TO A FINAL DESTINATION

(75) Inventors: Guido Mueller, Quedlinburg (DE); Thomas Fabian, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,709

(22) PCT Filed: Jun. 8, 2000

(86) PCT No.: PCT/DE00/01874
§ 371 (c)(1),
(2), (4) Date: Feb. 12, 2001

(87) PCT Pub. No.: WO00/79219
PCT Pub. Date: Dec. 28, 2000

(30) Foreign Application Priority Data

Jun. 22, 1999 (DE) .......................................... 199 28 295

(51) Int. Cl.⁷ .............................................. G01C 21/30
(52) U.S. Cl. ........................ 701/209; 701/200; 701/201; 701/207; 701/208
(58) Field of Search ................................ 701/200, 207, 701/208, 209, 210, 211, 201; 340/988, 990, 995; 73/178 R

(56) References Cited

U.S. PATENT DOCUMENTS

| | | | | |
|---|---|---|---|---|
| 5,486,822 A | * | 1/1996 | Tenmoku et al. | 340/990 |
| 5,513,110 A | * | 4/1996 | Fujita et al. | 340/990 |
| 5,712,632 A | * | 1/1998 | Nishimura et al. | 340/905 |
| 5,712,788 A | * | 1/1998 | Liaw et al. | 340/990 |
| 5,752,217 A | * | 5/1998 | Ishizaki et al. | 701/201 |
| 5,899,955 A | * | 5/1999 | Yagyu et al. | 340/988 |
| 5,933,100 A | * | 8/1999 | Golding | 340/988 |
| 5,938,720 A | * | 8/1999 | Tamai | 701/200 |
| 6,026,346 A | * | 2/2000 | Ohashi et al. | 340/990 |
| 6,072,409 A | * | 6/2000 | Fushimi et al. | 340/988 |
| 6,112,154 A | * | 8/2000 | Schupfner | 701/201 |
| 6,134,501 A | * | 10/2000 | Oumi | 701/201 |
| 6,192,314 B1 | * | 2/2001 | Khavakh et al. | 701/209 |
| 6,256,579 B1 | * | 7/2001 | Tanimoto | 701/201 |
| 6,349,261 B1 | * | 2/2002 | Ohnishi et al. | 340/995 |
| 6,401,034 B1 | * | 6/2002 | Kaplan et al. | 340/988 |

FOREIGN PATENT DOCUMENTS

DE 43 01 875 A 8/1993
EP 0 854 353 A 7/1998

* cited by examiner

*Primary Examiner*—Jacques H. Louis-Jacques
(74) *Attorney, Agent, or Firm*—Michael J. Striker

(57) ABSTRACT

The method calculates by means of a navigation device an optimized route to a final destination, which is constrained to pass through at least one transition region of a real road network. Each transition region corresponds to a surface region of a stored digital map, which represents the road network with segments having resistances and nodes. The location and extent of each surface region are defined by a user of the navigation device. Relevant segments are stored in a via area list (VAL) in the navigation device. Route segments are optimized in the navigation device by a route-searching algorithm and are stored in route tables. Segment optimizations are executed and results are stored in separate sectional route tables. The overall resistance of the route is minimized under constraint that it passes through the at least one surface region. A navigation apparatus for performing this method is also described.

14 Claims, 17 Drawing Sheets

METHOD AND DEVICE FOR DETERMINING A ROUTE FROM A STARTING LOCATION TO A FINAL DESTINATION

BACKGROUND OF THE INVENTION

1. Field of the Invention

The invention relates to a method for determining a route from a departure point to a destination, which is based on a digital map showing a real road network in segments with resistances and nodes, in which route segments are optimized by means of a route-searching algorithm and are stored in a route table, and at least one intermediate destination is predetermined. The invention also relates to an apparatus for determining a route from a departure point to a destination by the aforesaid method, which has a digital map stored in a memory.

2. Description of the Related Art

In means of locomotion, for example motor vehicles, airplanes or ships, permanently installed navigation systems guide the operator of the means of locomotion rapidly, simply and safely to a desired destination without the need for any prior, tedious route planning and for the acquisition and study of appropriate map material. To this end, appropriate navigation data based on, for example, maps, country maps or road maps, are stored in the navigation system, for example on CD-ROM. The navigation device uses, for example, GPS (global positioning system) to determine the instantaneous position and to calculate the required navigation instructions that will lead to a predetermined destination. The navigation data in this case preferably contain data about streets and roads for motor vehicles.

In conventional navigation systems, the driver of a motor vehicle can in various ways influence the course of a route to be calculated, namely by selecting cog different optimization criteria, such as "short route", "fast route", "avoid superhighways", by influencing road sections manually or by traffic telecommunications, which in the route calculation are then by-passed or facilitated, or by defining one or more intermediate destinations which the driver then passes sequentially on his way to the final destination. If the driver wishes "to travel from Kassel to Minden via Hannover", only the last-said alternative is open to him. In Hannover, he must define an intermediate destination, which, for example, is the center of the city, after which two route calculations are made. A first route from Kassel to Hannover and a second route from Hannover to Minden are calculated. Linking the two routes together then gives the overall route. With the Alpine navigation system "GP Shuttle, NVE-N055VP", for example, it is possible to select up to five intermediate destinations.

However it is a disadvantage that, when intermediate destinations are used, several route calculations, independent of each other, must be performed, their number depending on the number of intermediate destinations. Namely, it is first necessary to calculate the partial routes from the current position to the intermediate destination, then from said intermediate destination to the next one and finally to the actual destination. In this manner, however, the partial routes and not the overall one are optimized. Even when the indicated intermediate destination is not a city but a region, for example the region of the city of Hannover, the optimization of the route is carried out only as far as the boundary of the region so that the first partial route in the afore-described case ends somewhere at the outskirts of the city of Hannover. The exact location of this point on the periphery of Hannover depends only on the route from the departure point to this intermediate destination. Optimization of the point on the periphery of Hannover or of the subsequent route, for example, to the final destination or to the next intermediate destination, however, is not possible. In the area of the intermediate destination, this may result in unfavorable routing, nonsensical turns or avoidable city crossings.

SUMMARY OF THE INVENTION

The object of the present invention is to provide an improved method of the above-described type for determining a route from a departure point to a final destination based on a digital map, which represents a real road network with segments with resistances and nodes, which method eliminates the above-said disadvantages and ensures calculation of an optimal route, even when the user of a navigational method specifies intermediate destinations.

This method according to the invention comprises the steps of:

a) predetermining at least one intermediate destination through which the route must pass, each intermediate destination consisting of a respective transition region formed by a corresponding group of segments;

b) then optimizing segments for the route by means of a route search ok algorithm to obtain optimized segments and storing the optimized segments in a route table, and c) minimizing an overall resistance of the route from the departure point to the final destination, with the proviso that the route is constrained to pass through the respective transition region of each intermediate destination.

The advantage of this is that the determination of the route to be calculated can be intentionally influenced by specifying transition regions (via areas). In contrast to conventional methods with intermediate destinations, the route is optimized from the departure position through the transition region to the destination as a whole and not in sections. Moreover, the driver need not worry about the definition of an actual intermediate destination. The use of the invention ensures that, after the calculation of the route, at any point in time, the optimum route from any possible departure point or any possible position of a motor vehicle to the final destination is possible by passing through the transition region or transition regions. In this manner, the distance to the destination and the remaining travel time or the estimated time of arrival can be indicated. In the route calculation from the departure point to the final destination, besides the conventional, predeterminable criteria, for example "short route", "fast route" or the like, one or more via areas are taken into consideration, the via areas being included by the user into the calculated route in a predetermined sequence.

In a preferred embodiment, each intermediate destination is defined as a transition region in the form of a surface region of the digital map, and corresponding segments located in the area of the transition region in question are assigned and stored in a transition region list. A first segment optimization is performed starting from a destination segment corresponding to the destination, and the result is stored in a first route table, additional sectional segment optimizations corresponding to the number of predetermined transition regions being performed and stored in separate sectional route tables. At the end of the first segment optimization, the segments stored in the originally initialized and destination-initialized transition region list with the corresponding resistances from the first route table are updated. Furthermore, at the beginning of each sectional segment optimization, the current resistances of the segments of the transition region list are entered into the originally initialized sectional route table. Furthermore, at the end of the first and up to the penultimate sectional segment optimization, the resistances of the segments stored in the current transition region list with the resistances of the corresponding segments of the sectional route table are updated, and after the last sectional segment optimization, starting with the last sectional route table, and up to the first route table, a route list is compiled from these tables so as to minimize the overall resistance of the route from the departure point through one or more intermediate destinations to the final destination.

Advantageously, the compilation of the route list is accomplished in that, starting with the sectional route table of the last-performed sectional segment optimization, the relevant segments are entered into the route list one after the other until no follower to a segment is defined in the sectional route table. The procedure is continued in the same manner with this segment and with a next and further sectional route table up to the first route table, the sequence in which the sectional route tables are processed being predetermined in the transition region list.

In a preferred embodiment, a transition region description list and a transition region index table are stored in the transition region list the transition region index table containing an assignment of transition regions to the transition region description list and route tables, and the transition region description list containing segments with corresponding resistances and assigned to a transition region.

In this case, the destination with resistance zero is the first entry into the transition region description list.

In the original initialization, all resistances are set equal to infinity and any stored followers are cancelled, whereas for the destination initialization the resistances of a segment corresponding to the destination are set equal to zero.

Advantageously, the chosen transition region is a rectangle, polygon, ellipse or circle around a prominent point, particularly a city, congested area or superhighway exit.

The description of the transition regions may purposely be left vague in spatial terms, because the driver only wants to influence the overall route.

In addition, network influencing through telecommunication and/or user-defined manipulations, for example "traffic jam ahead" obstructions, is advantageously taken into consideration in the route calculation. In this manner, it is possible to influence the route dynamically through a telecommunication service provider, for example to guide traffic flow. The navigation computer in the motor vehicle remains here fully autonomous and can react in a self-sufficient manner and rapidly when the driver deviates from the route.

According to the invention, the apparatus for performing the method is provided with a device for entering and defining at least one intermediate destination defined as a transition region in the form of a surface region of the digital map. Also provided is a storage device for storing the properties and, if necessary, the sequence of the transition region or regions, namely an index memory.

In an advantageous embodiment the apparatus comprises a navigation computer, a data storage device containing the digital map as an image of the real road network, a sensing device, a position-finding device, the index memory, an interface, a loudspeaker, a display and an input device.

BRIEF DESCRIPTION OF THE DRAWING

In the following, the invention is explained in greater detail by way of the attached drawings in which.

DETAILED DESCRIPTION OF THE INVENTION

The method of the invention determines a route from a point of departure to a destination via at least one user-defined intermediate destination with the aid of a digital map base which contains segments with an assigned resistance and which correspond to real roads in a real road network. This inter-mediate destination or these intermediate destinations are not exact, but are given as spatially vague areas. In the calculation of the route, the total resistance of all segments belonging to the route is minimized, with several segments between the intermediate destinations possibly being available for selection. The selection of the segments between the intermediate destinations with the aid of the method of the invention is then made so that the total resistance of the route is minimized.

In the following, the method of the invention is described in detail by way of a concrete example of practical execution. First, by reference to FIGS. 1 to 7, a more detailed explanation will be provided of the representation of the real road network with the aid of the digital data base or map base and by use of a route-searching algorithm.

Figure 1:
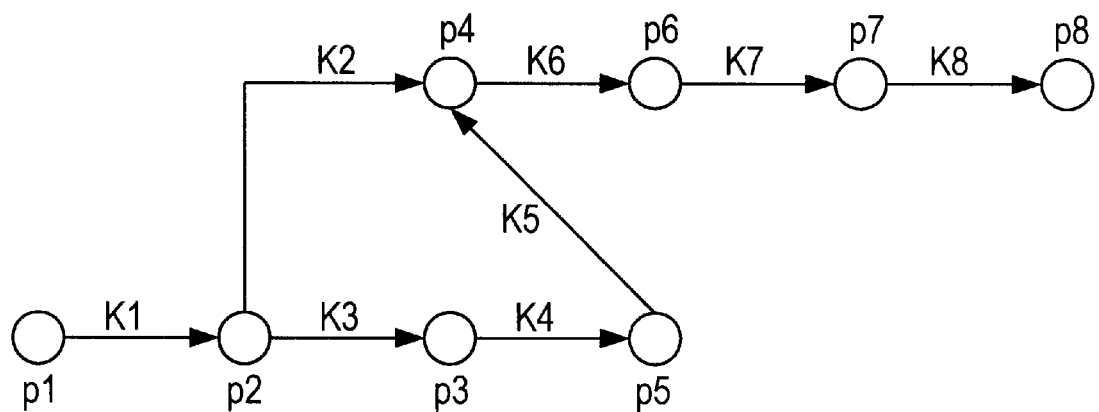
FIG. 1 shows an example of a digital map network.

As can be seen in FIG. 1, for mathematical processing with the route-searching algorithm, the road map is presented as a graph with segments k and nodes p, the segments representing roads and the nodes representing interconnections of the roads or road network. FIG. 1, shows eight segments $k_1$, $k_2$, $k_3$, $k_4$, $k_5$, $k_6$, $k_7$ and $k_8$, and eight nodes $p_1$, $p_2$, $p_3$, $p_4$, $p_5$, $p_6$, $p_7$ and $p_8$. Be flow of traffic is directional, a segment k must also be represented as a directed vector. Moreover, to segments k are assigned resistances, or road resistances, representing a measure of the effort required to travel from one network node to another. For example, the length of a segment is used as the road resistance. Alternatively, by considering an average traffic flow velocity, the travel time on a segment may be taken as its particular road resistance. Moreover, maneuvering resistances can be assigned to the nodes. Finally, all best-path algorithms determine a route between a departure segment and a destination segment in a directional graph, characterized in that the sum of all road resistances of the segments of the established route are minimal.

The standard algorithm for route calculation is a method based on the known best-path algorithms of the graph theory, by Ford and Moore, these algorithms being adapted to the special requirements of use in self-sufficient vehicle navigation systems.

In the route calculation, such best-path algorithms operate by backward iteration. They visit all segments in the graphs and evaluate them in terms of the most advantageous paths to the destination segment. In other words, starting from a destination segment, in each iteration step an advantageous path in terms of resistance is sought in a backward manner to segments contained in a list, which segments have been optimized in the previous iteration step. The result of this method is an optimum route from each segment in the graph to the destination segment. For representation of the calculation results, a route table is stored in the memory of the navigation device. For example, such a table for the graph represented in FIG. 1 would look as follows.

TABLE 1

Route Table

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| $k_4$ | ∞ | — | ∞ | — |
| $k_5$ | ∞ | — | ∞ | — |
| $k_6$ | ∞ | — | ∞ | — |
| $k_7$ | ∞ | — | ∞ | — |
| $k_8$ | ∞ | — | ∞ | — |

For each segment in the graph, the table shows the resistance to the destination segment and the follower segment following in the direction of the destination. As initialization value, the resistance is set equal to "infinity" (symbol ∞) and the follower segment to "undefined" (symbol −). A positive sign in the resistance and follower columns indicates that the particular segment is considered in the direction of its arrow, whereas a negative sign indicates that the particular segment is considered in the direction opposite to its arrow.

Before the beginning of the iterative optimization, the destination segment is initialized in the route table with zero resistance. Let us now use segment $k_1$ as an example of a destination segment. For a destination initialization, the stored route table then looks as follows.

TABLE 2

Route Table

| Segment | +Resistance | +Follower Seg. | −Resistance | −Follower Seg. |
|---|---|---|---|---|
| $k_1$ | 0 | — | 0 | — |
| $k_2$ | ∞ | — | ∞ | — |
| $k_3$ | ∞ | — | ∞ | — |
| $k_4$ | ∞ | — | ∞ | — |
| $k_5$ | ∞ | — | ∞ | — |
| $k_6$ | ∞ | — | ∞ | — |
| $k_7$ | ∞ | — | ∞ | — |
| $k_8$ | ∞ | — | ∞ | — |

Moreover, destination segment $k_1$ is entered in a list of already optimized segments stored in the navigation device. This gives a list of already optimized segments as shown in the following list 1.

TABLE 3

List 1
(List of already optimized segments)

| $+k_1$ | $-k_1$ | | | |
|---|---|---|---|---|

There is also a second list for storing the segments to be evaluated in the next optimization step. At the beginning of the procedure, this list is empty, as shown in the following list 2.

TABLE 4

List 2
(List of segments to be evaluated in the next step)

| | | | | |
|---|---|---|---|---|

Figure 2:
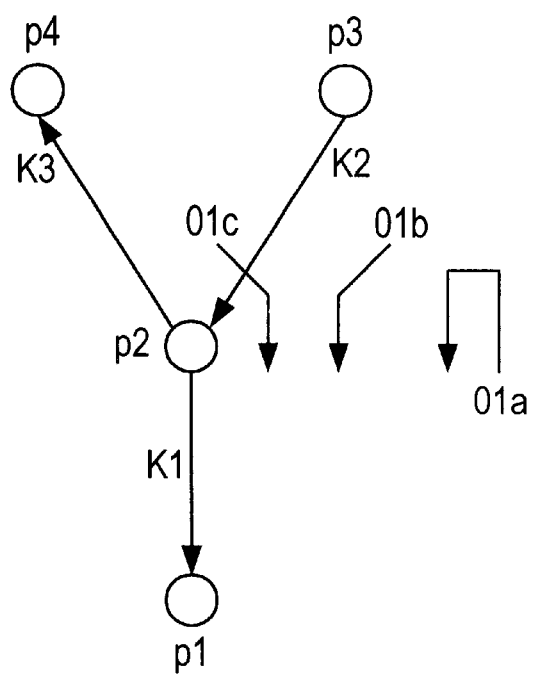
FIG. 2 illustrates the optimization steps.

After the above initialization, the procedure starts by considering all segments shown in list 1 as fictitious current positions of the vehicle and subjecting all segments connected with this "current segment", referred to as the "arrival segments", to an optimization test (O). In the said example (see FIG. 1), the segments connected to the current segment $+k_1$ are $-k_1$, $+k_2$ and $-k_3$ (=arrival segments). The situation is as shown in FIG. 2, with O1a, O1b and O2c indicating the corresponding optimization tests. Segment $k_1$ is the current segment, whereas segments $k_2$ and $k_3$ are the arrival segments. For the optimization, it is assumed that the vehicle is located on an arrival segment with the travel direction toward the current segment. In the optimization test, the resistance of a particular arrival segment to the destination is now compared with the resistance the arrival segment would have if it led to the destination via the current segment. In this case, the resistance optimization condition is given by Resistance (arrival segment)>road resistance (arrival segment)+ resistance (current segment)

Here "resistance" stands for the resistance entered into the route table and "road resistance" stands for the road resistance assigned to the particular segment in the graph (see FIG. 1). In other words, the optimization condition serves to determine whether the old route from the arrival segment is worse than the new route using the current segment. If the route via the current segment is found to be optimal, an optimization is undertaken. Referring to FIG. 2, the following optimization relationships are obtained.

TABLE 5

Optimization for Current - Arrival Segment Relationships

| Optimization | Current Segment | Arrival Segment |
|---|---|---|
| O1a | +$k_1$ | −$k_1$ |
| O1b | +$k_1$ | +$k_2$ |
| O1c | +$k_1$ | −$k_3$ |

For each current—arrival segment relationship, an optimization test is performed as shown on the example of arrival segment +$k_2$ (optimization O1b). In the optimization test, the old route table resistance of arrival segment +$k_2$ to the destination is compared with the resistance the arrival segment would present if it led to the destination via the current segment.

$$R_{RT,Ist(+k_1)} + R_{Kante,Ank(k_2)} < R_{RT_{Alt},Ank(k_2)}$$

wherein $R_{RT,Ist(+k_1)}$ is the resistance of the current segments $k_1$ to the destination from the route table, $R_{Kante,Ank(k_2)}$ is the segment resistance of arrival segment $k_2$, and $R_{RT_{Alt},Ank(k_2)}$ is the resistance of arrival segment +$k_2$ from the route table.

["Ist"=current; "Kante"=segment; "Ank"=arrival; "Alt"=old−Translator]

Optimization takes place when the condition is met, namely the new resistance of the arrival segment is lower than the old resistance. The resistance of the arrival segment is replaced in the route table with the new, lower value. The current segment is entered as the follower segment and the optimized arrival segment is entered into list 2.

When all segments of list 1 have been processed as described, list 1 and list 2 are switched, namely the segments optimized in the previous step serve as the departure point for the next optimization. The procedure ends when list 1 is found to be empty, namely when the preceding step gives no optimized segments.

The afore-described problem of a suboptimal overall route, namely the linking of individual, previously independently optimized partial routes, will be explained in the following. In the following description of the invention, this will make the invention's special effect vs. the prior art stand out even more clearly.

Figure 3:
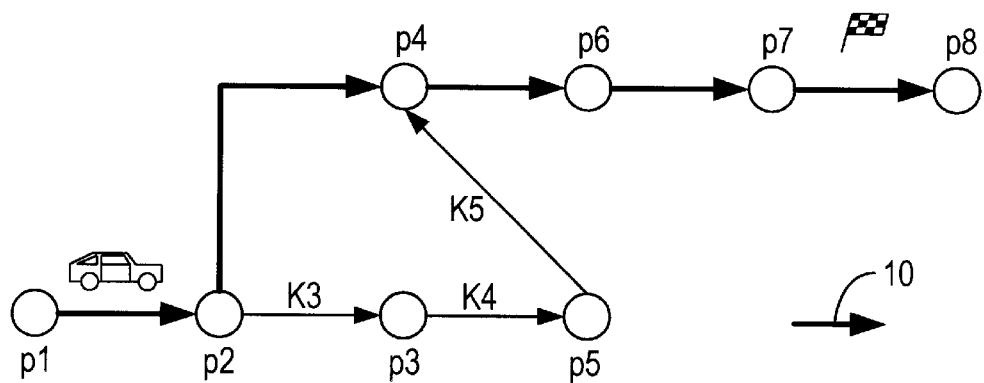
FIG. 3 shows an overall route without an intermediate destination.

FIG. 3 shows the network to be considered, arrow 10 indicating a route direction. It is assumed that all segments have a resistance value of 10 with the exception of segment $k_2$ which has a resistance value of 15. The destination is segment $k_8$. The optimum route from the current position (segment $k_1$) to the destination $k_8$ is to be determined. Application of the afore-described best-path algorithm of Ford and Moore, and the use of the corresponding optimization rule or resistance give the route, also shown in FIG. 3. The overall resistance is 45.

Figure 4:
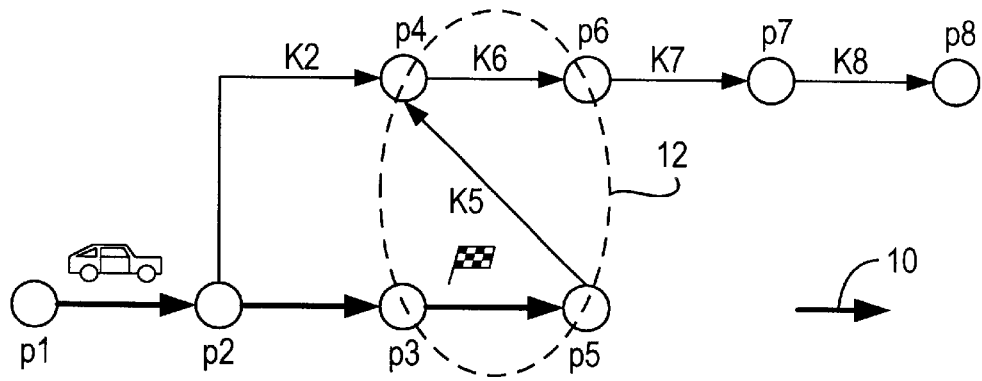
FIG. 4 shows a partial route from the departure point to the intermediate destination.
Figure 5:
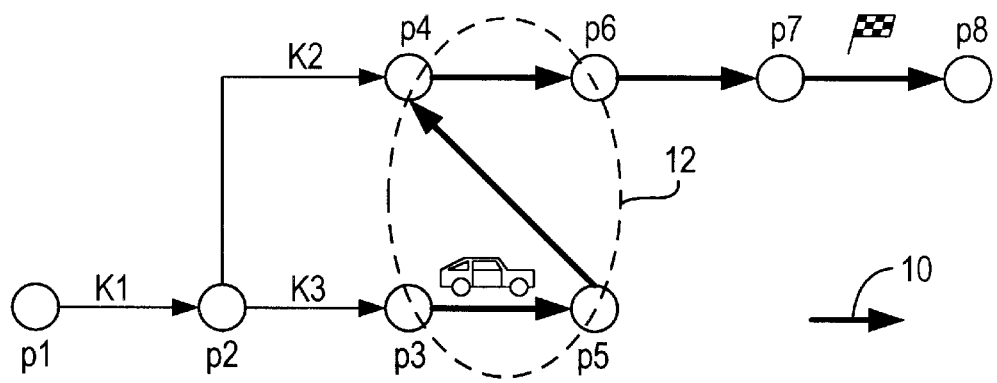
FIG. 5 shows a partial route from the intermediate destination to the final destination.
Figure 6:
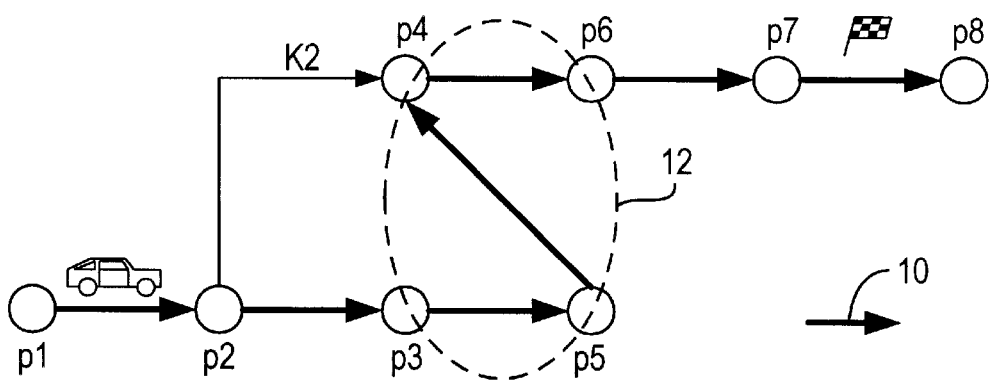
FIG. 6 shows an overall route with an intermediate destination and an intermediate destination route search.

Let us now extend a network example by an intermediate destination 12 consisting of segments $k_4$, $k_6$ and $k_6$ as shown in FIGS. 4 to 6. The route from the current position (segment $k_1$) via intermediate destination 12 to the destination (segment $k_8$) is divided into two sequentially calculated partial routes. The calculation of the partial routes in both cases is done with the aid of the afore-described method and optimization rules. First, the first partial route from the current position (segment $k_1$) to the intermediate destination 12 is determined. This gives the first partial route with resistance 20 as shown in FIG. 4. The second partial route is determined from the end of the first partial route at intermediate destination 20 to the destination. It is entered in FIG. 5 and has resistance 40. Linking together the two partial routes shown in FIGS. 4 and 5 gives the overall route from the beginning (segment $k_1$) via intermediate destination 12 to the final destination (segment $k_8$), as shown in FIG. 6. The resulting route has a resistance of 20+40=60.

Figure 7:
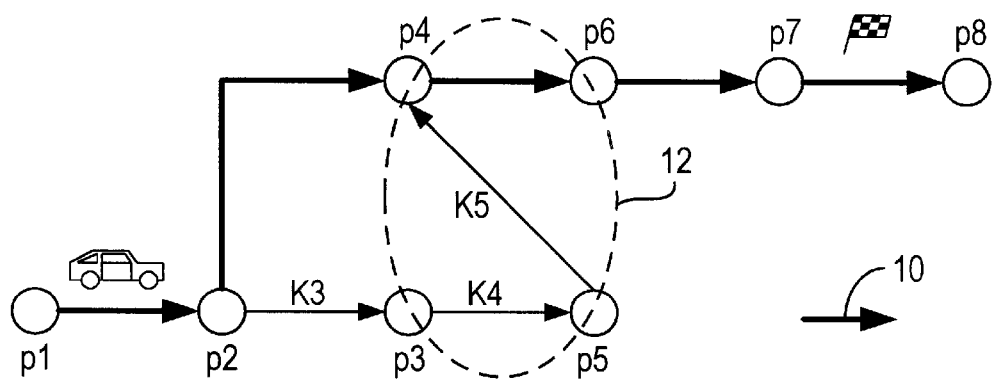
FIG. 7 shows an overall route with an intermediate destination, but without an intermediate destination route search.

By comparing this overall route according to FIG. 6 with the initially calculated route according to FIG. 3, it is striking that the route found via intermediate destination 12 is not the optimum overall route from the departure (segment $k_1$) via the intermediate destination 12 to the final destination (segment $k_8$). The initially determined route according to FIG. 3 shows from the current position (segment $k_8$) to the final destination (segment $k_8$) a resistance value of 45 and also passes through intermediate destination 12. Hence, this route would be a better route via intermediate destination 12, as shown in FIG. 7. This example illustrates that previous methods for route calculation are not capable of determining an optimum route from a current position to a final destination via a predetermined intermediate destination.

According to the invention, it is now proposed to use for the route calculation besides the conventionally needed information, namely, for example, a starting position obtained by GPS positioning and a destination entered by the user via a user interface, one or more predetermined transition regions, in the following referred to as via areas. The via areas are specified, for example, by normal geographic coordinates onto which is applied the image of a predetermined geometry, for example that of a circle, rectangle, polygon or ellipse. In addition to the selection available from an index through a menu item of the navigation system, the user has, preferably, also the possibility of selecting a point from a map. The shape of the via area, for example an ellipse, rectangle or circle, as well as its size can advantageously be selected from a menu or a menu item or they can be modified directly on the map. To this end, the following boundary conditions are prespecified.

From the straight-line distances between the departure point, the destination and the via area, a maximum and a minimum size of a region, which the user or driver can select as the via area, are set. A long distance means higher minimum and maximum values. If in the region specified as the via area there are no appropriate segments available as via area segments, the region is enlarged until at least one appropriate segment is found.

The sequence from the via areas to be touched by the route is first determined by the input sequence. The user or driver also has the possibility of rearranging the sequence of the via areas. The via areas and their sequence are stored in a transition region index table or via area index table, in the following briefly referred to as VAIT. Based on the geographic description of the via area, the segments assigned to this via area are stored in a transition region description list or via area description list, in the following briefly referred to as VADL. In this list are stored besides the segments themselves also the predetermined properties needed for the route calculation. A complete description of the via areas is thus provided only by the VAIT and the VADL together, these two together being referred to in the following as the transition region list or via area list or briefly as VAL.

After indicating the destination and possibly the departure point and after specifying the via areas to be used, the route search described below is started in accordance with the desired criteria.

Figure 8:
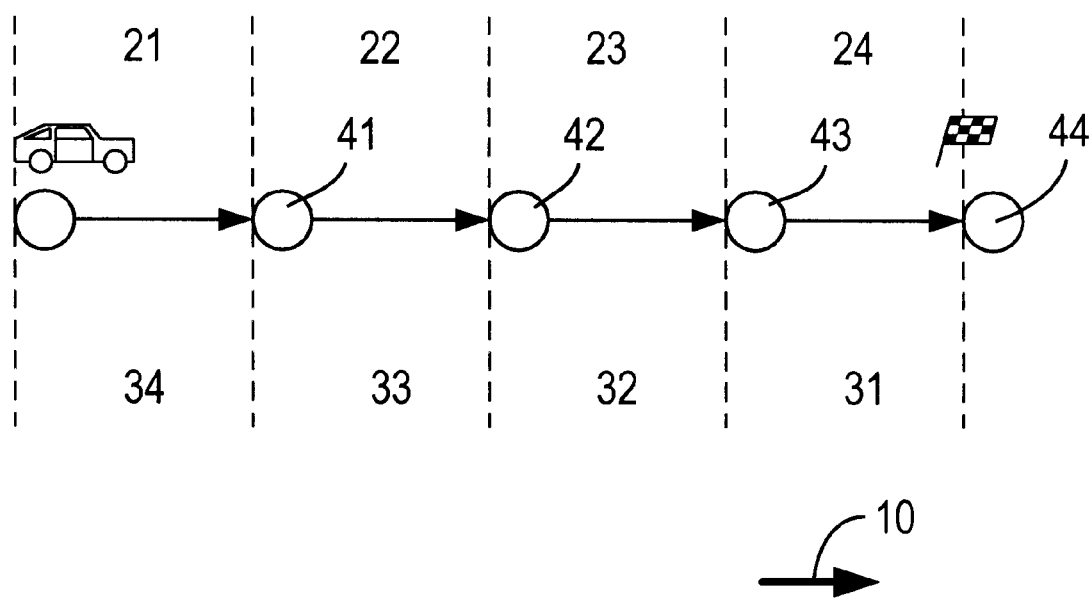
FIG. 8 shows the division of a region of a digital map into sections and via areas.

In a via area route search, the overall route is subdivided into individual sections, as shown in FIG. 8. In contrast to the intermediate destination route search according to the prior art, the boundaries of the sections are not sharply separated from each other but overlap instead. For a better understanding, however, it is advantageous to assign the first to fourth via areas 41 to 44 to certain sections. The designation and the counting of the sections depends on the view taken. The sections of the route, in the following referred to as first to fourth route section 21 to 24, are counted from the current vehicle position in the direction of the destination. When considering the optimization view, the sections are counted starting from the destination, in the following referred to as first to fourth optimization sections 31 to 34. In the region of the via areas, there exists a certain assignment vagueness, because the route is described in both sections. Starting from the optimization for which the properties of the via area segments in the direction of the destination are already known, these properties are always added to the previously optimized section. Thus the destination itself belongs to no section but is viewed as a fourth via area 44.

Figure 9:
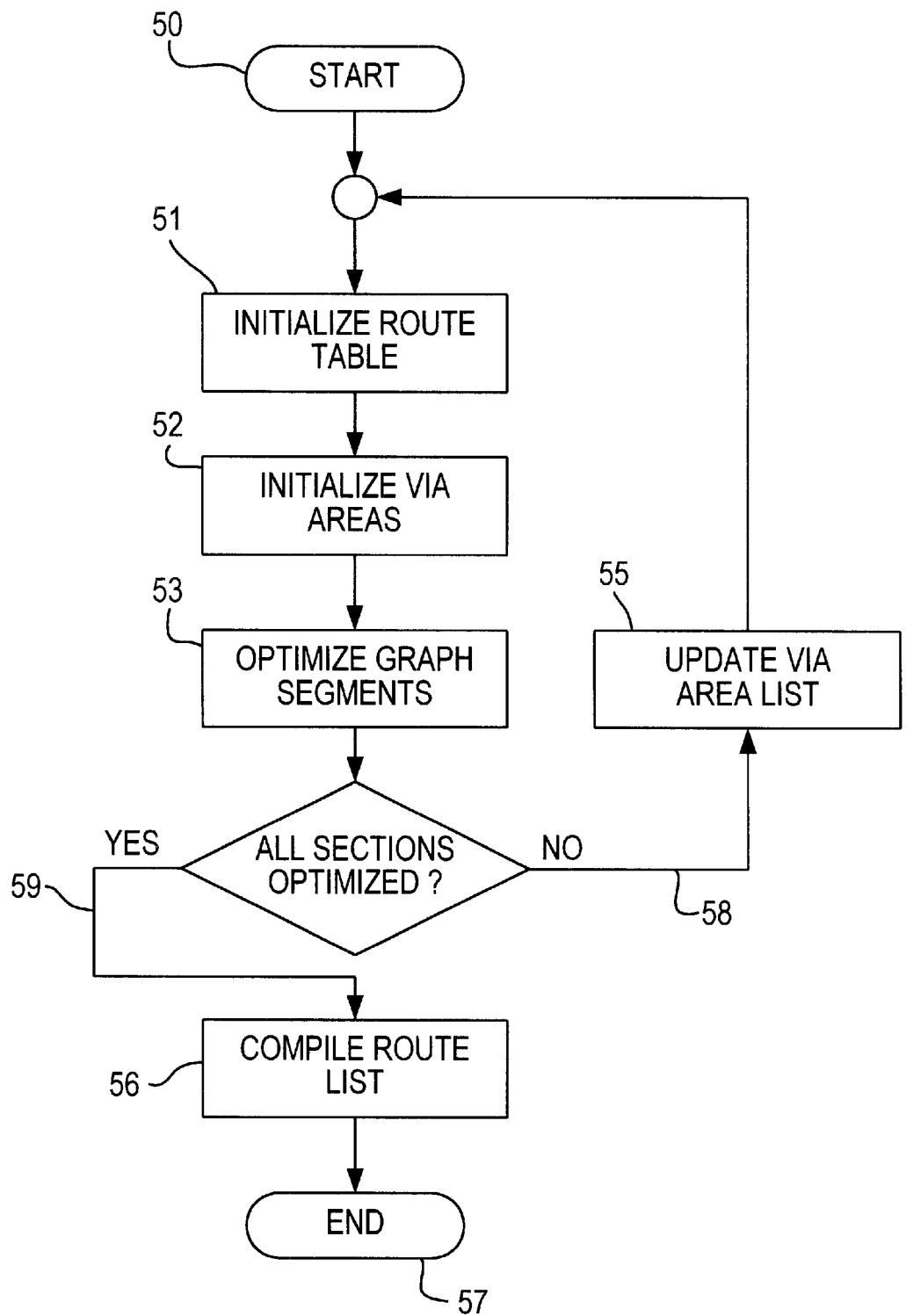
FIG. 9 is a flow diagram of a route search according to the invention.

The via area route search according to the invention is illustrated in FIG. 9 as a flow diagram and is divided into the following parts: start in step 50, initialization of the route table in step 51, initialization of the via area or via areas in step 52, optimization of the segments of the graph in step 53, deter-mining whether all sections are optimized in step 54, if NO in step 54 (path 58), updating of the via area list in step 55, if YES in step 54 (path 59), compiling the route list in step 56 and termination in step 57.

The procedure of the via area route search is based on a best-path algorithm by Ford and Moore in which a route table is used to describe the properties of the segments of the graph. To be able to describe each section individually, a route table is provided for each section, in the following referred to as the route section table. VAL is used as cross-reference between these route section tables. In addition, two lists are provided for storing the segments to be optimized and the already optimized segments.

The route table contains the description of the properties of all network segments for a section of the route to the destination. Each segment is presented by an input containing the properties of the segment in the direction of the arrow as well as in the opposite direction. The following table illustrates an originally initialized route table for M segments.

TABLE 6

Originally Initialized Route Table

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| ... | | | | |
| $k_{M-1}$ | ∞ | — | ∞ | — |
| $k_M$ | ∞ | — | ∞ | — |

In the via area route search, each route section is described in a separate route table, because the resistance of a segment and of the follower segments to the destination can be different for different sections.

The description of the via areas and the linking with the corresponding segments in the graph occurs by a mutual linking of the via area index tables (VAIT) and the via area description list (VADL). All via areas are contained in the VAIT. The sequence of the entries into this table determines the sequence in the route (via area 1 is the first via area of the route etc.). The first entry contains no via area but serves only as a reference for the route table of the first route section. The last entry into the VAIT is the actual destination. This simplifies control of the sequence of events in the route search. To each via area is assigned a route table in the VAIT. Because the last entry refers to the destination and thus has no corresponding section, as stipulated, no route section table is assigned to it.

For each via area, a reference to the list of segments belonging to the via area (VADL) is stored in the VAIT. For each segment, in addition to the via area index, the resistance to the destination for each of the two directions is stored. When the segments are entered into the list, the resistance for both directions is set equal to infinity.

TABLE 7

Make-up of the Via Area Index Table (VAIT)

| Via Area Index | Reference to VADL | Route Table |
|---|---|---|
| — | | 1 |
| 1 | | 2 |
| 2 | | 3 |
| 3 | | 4 |
| ... | | ... |
| N-1 | | N |
| N | | — |

TABLE 8

Make-up of the Via Area Description List (VADL)

| Index | Segment | Next Index | Via Area Index | +Resistance | −Resistance |
|---|---|---|---|---|---|
| 1 | | | | ∞ | ∞ |
| 2 | | | | ∞ | ∞ |
| 3 | | | | ∞ | ∞ |
| ... | | | | | |
| M | | | | ∞ | ∞ |

Figure 10:
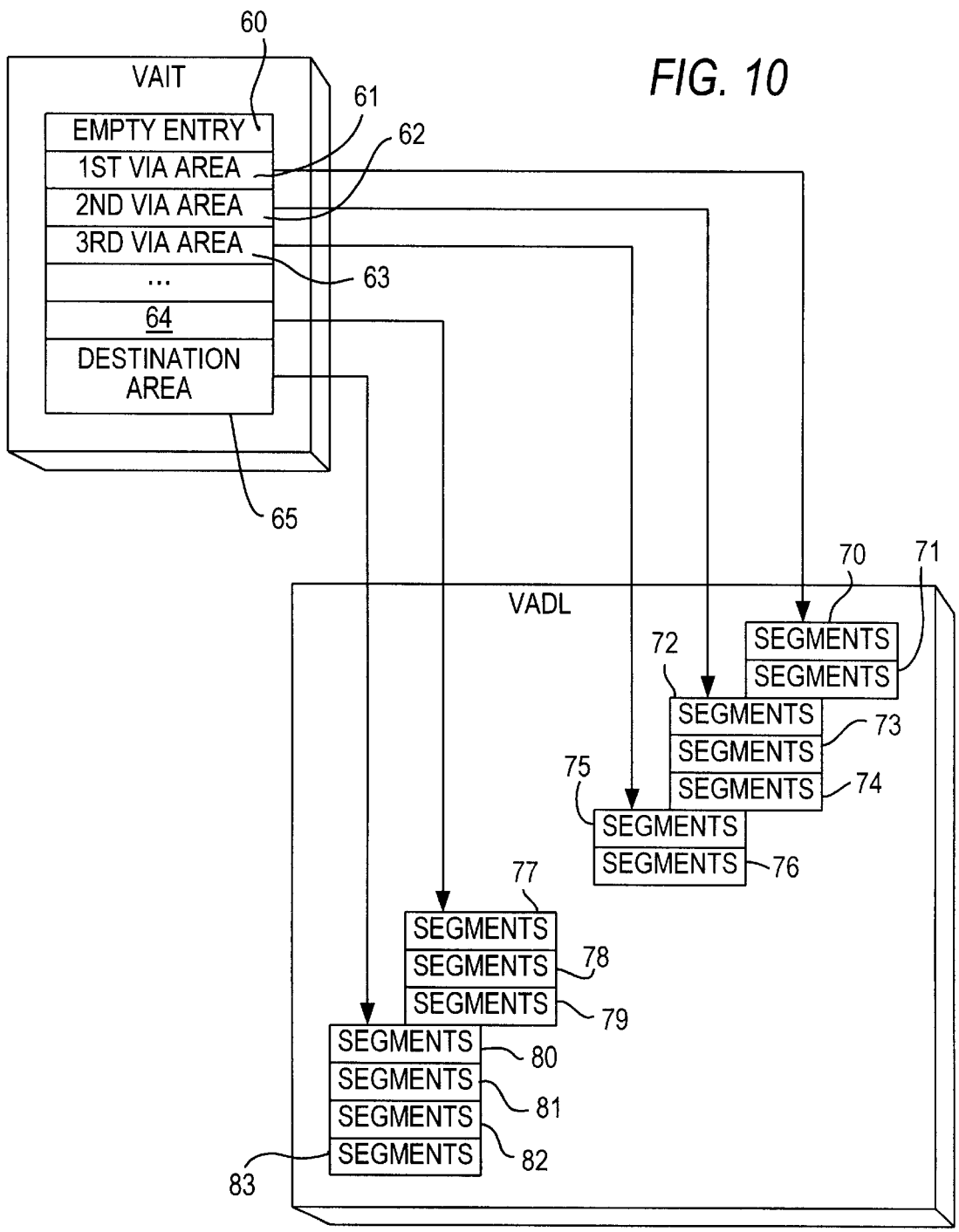
FIG. 10 is a schematic representation of the relationship between the via area index table and the via area description list.

FIG. 10 illustrates the relationship between VAIT and VADL. To each via area (VA) 14 of a VAIT 16 are assigned corresponding segments in VADL 18. The first entry 60 in the VAIT is empty. Segments K1(VA1) 70 and K2(VA1) 71 are assigned to the first via area 61. Segments K1(VA2) 72, K2(VA2) 73 and K3(VA2) 74 are assigned to the second via area 62. Segments K1(VA3) 75 and K2(VA3) 76 are assigned to the third via area 63. Segments K1[VA(N−1)] 77, K2[VA(N−1)] 78 and K3[VA(N−1)] 79 are assigned to the (N−1)th via area 64. The N-th via area 65 corresponds to the destination, and to this via area are assigned segments K1(destination) 80, K2(destination) 81, K2(destination) 82 and K3(destination) 83.

The optimization of the via area route search is partly equivalent to the optimization of a conventional route search. List 1 is used to store already optimized segments, as in the conventional route search. List 2 contains the segments to be evaluated in the next optimization step. All arrival segments from a current segment are checked as previously explained in greater detail by reference to FIG. 2. Because in the via area route search according to the invention, each section is optimized in its own route table, it is possible to use the condition for optimization of the conventional route search.

In the following, the route search or optimization of the segments of the graph according to the invention will be explained in greater detail. First, the original initialization of the route table of the current section is performed. To this end, the resistance is set to infinity and the follower is cancelled (see Table 6). After this original initialization of the route table, the resistance of the segments of the last via area from the VADL (see Table 8) is entered into the route table, and the segments are taken up into the list of the segments to be optimized. The follower of these segments is set to the initialization value, namely to no follower, to indicate that the further route description is to be found in the route table of the next route section. The last entry into the VAIT (see Table 7) is used for the first section to be optimized. According to the stipulation, this is the destination itself so that no special treatment is needed for the first optimization section.

The actual route search takes place after the initialization of the route table and the via area or of the VAIT and VADL. The optimization of the section of the route is carried out according to the optimization rules presented in FIG. 11. Segment optimization begins in step 90. In step 91, the following optimization condition is tested:

$$R_{RT,Ist} + R_{Kante,Ank} < R_{RT_{Alt},Ank}$$

wherein $R_{RT,Ist}$ is the resistance of the current segment to the destination from the route table $R_{Kante,Ank}$ is the segment resistance of the arrival segment, and $R_{RT_{Alt},Ank}$ is the resistance of the arrival segment from the route table.

["Ist"=current; "Kante"=segment; "Ank"=arrival; "Alt"=old–Translator]

In other words, the segment must be optimized if the sum of the resistance of the current segment entered into the route table and the segment resistance of the arrival segment is lower than the old resistance of the arrival segment entered into the route table. If the result of this test is "YES", the procedure continues along path 92, and if the result of this test is "NO", it continues along path 93. In path 92, the particular entry into the route table is updated in step 94 by updating the resistance of the arrival segment in the route table, and the current segment is entered as the follower segment. Segment optimization ends in step 95.

Figure 11:
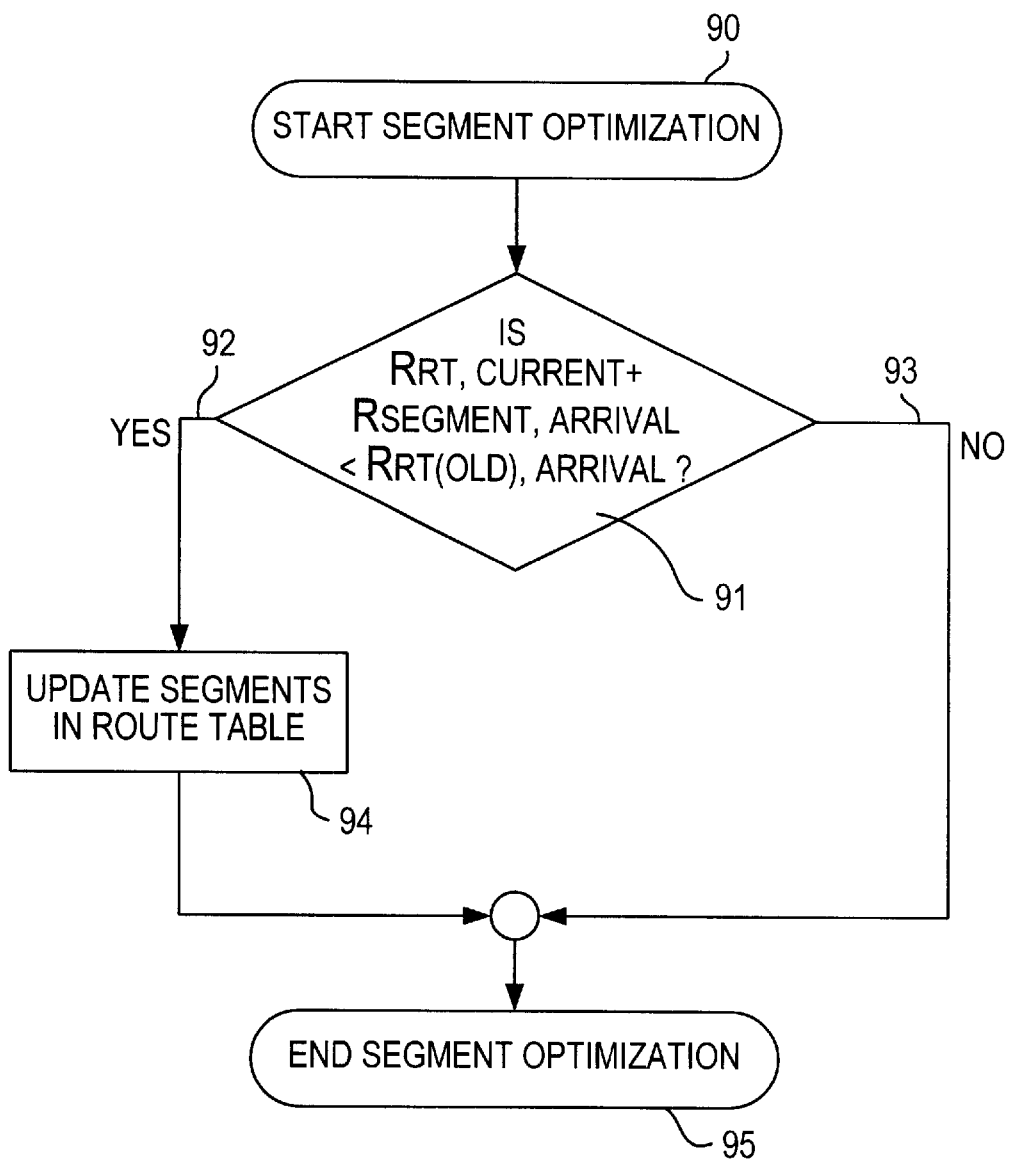
FIG. 11 is a flow diagram of an optimization condition.

The segment optimization according to FIG. 11 is carried out for all segments entered in list 1. When all these segments are processed in this manner, lists 1 and 2 are switched, namely the segments optimized in the last step serve as the starting point for the next optimization. The procedure terminates when list 1 is found to be empty.

The VAL is then updated as follows. After the above-described optimization of the segments of the graph of the current section, the resistance values of the via area of the following section are updated in the VADL. These values represent the starting point for the optimization of the next section. If the next section is the last one to be optimized, namely the first route section, then the updating of the VAL is omitted and the following step is carried out.

Figure 12:
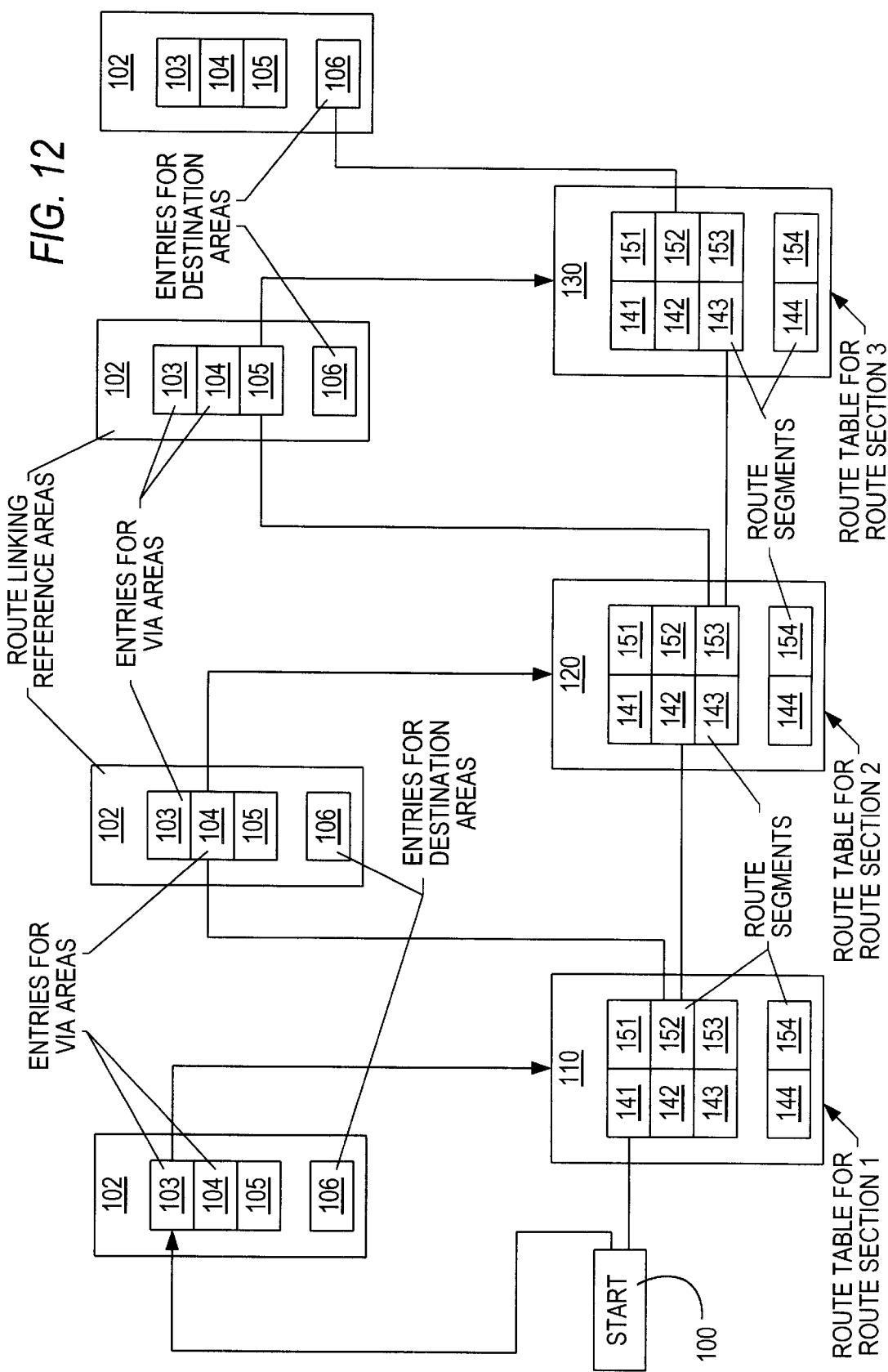
FIG. 12 is a schematic representation of the relationship between the via area list and the route tables, FIG. 13 exemplifies a digital map network.

After the optimization of the last optimization section 34 (FIG. 8), the route list is created from the individual route tables of the individual sections and the VAL. Starting with the segment of the current vehicle position (departure point), the segments are entered into the route list in the sequence of the follower linking in the first route table. The following via area is reached at the first segment without follower. The route table of the next route section is determined in accordance with the VAIT. In this table, starting from the last-processed segment, the linking is continued in the direction of the destination to the next segment without follower. This procedure is performed for each section. In the last route section, the segment without follower is the destination segment itself. In the VAIT, there is therefore no further reference to another route table, and the compilation of the route list is completed. This compilation of the route list from the individual route tables by use of links from the VAL is illustrated in FIG. 12. The route begins at Start 100 (starting point) and is put together by linking the individual route tables 110, 120 and 130 of the particular route sections 1, 2 and 3 according to the references in the updated VAL 102 obtained after the various route searches. The VAL contains the entries "VA-" 103, "VA 1" 104, "VA 2" 105 for the particular via areas (VA) and "destination" 106. The route tables 110, 120, 130 contain the entries for the segments +k1, +k2, +k3 . . . +kn 141 to 144, and –k1, –k2, –k3 . . . –kn 151 to 154.

To further illustrate the method of the invention, in the following an actual route search according to the method of the invention will be explained in greater detail. The network example shown in FIG. 6 will serve as the starting point. For this network, it is assumed that all segments have a resistance of 10 with the exception of segment $k_2$ which has a resistance of 15. The destination is again $k_8$. An optimum route is to be determined from the current position to this destination taking into consideration via area 14. The segments $k_4$, $k_6$ and $k_8$ belong to via area 14. After defining the destination and via area 14, the following VAIT and VADL contained in the VAL are obtained.

TABLE 9

Via Area Index Table (VAIT) After Via Area and Destination Definition

| Via Area Index | Reference to VADL | Route Table |
|---|---|---|
| — | — | 1 |
| 1 | 2 | 2 |
| 2 | 1 | — |

TABLE 10

Via Area Description List (VADL)
After Via Area and Destination Definition

| Index | Segment | Next Index | Via Area Index | +Resistance | –Resistance |
|---|---|---|---|---|---|
| 1 | $k_8$ | — | 2 | 0 | 0 |
| 2 | $k_4$ | 3 | 1 | ∞ | ∞ |
| 3 | $k_5$ | 4 | 1 | ∞ | ∞ |
| 4 | $k_6$ | — | 1 | ∞ | ∞ |

The original initialization of the route table of the first optimization step from the destination to the via area is performed according to Table 11. To this end, the resistance for each entry is set to infinity, and the follower is cancelled.

TABLE 11

Originally Initialized Route Table for the First Optimization Section

| Segment | +Resistance | +Follower Seg. | –Resistance | –Follower Seg. |
|---|---|---|---|---|
| $k_1$ | ∞ | — | ∞ | — |
| $k_2$ | ∞ | — | ∞ | — |

TABLE 11-continued

Originally Initialized Route Table for the First Optimization Section

| Segment | +Resistance | +Follower Seg. | −Resistance | −Follower Seg. |
|---|---|---|---|---|
| $k_3$ | ∞ | — | ∞ | — |
| $k_4$ | ∞ | — | ∞ | — |
| $k_5$ | ∞ | — | ∞ | — |
| $k_6$ | ∞ | — | ∞ | — |
| $k_7$ | ∞ | — | ∞ | — |
| $k_8$ | ∞ | — | ∞ | — |

The current section is the first section to be optimized so that the last entry into the VAIT must be used. In accordance with the stipulation, this is the destination itself. After the original initialization, the resistance of the segments of the destination from the VADL is entered into the route table, and the segments are taken up into list 1 (Table 13) of the segments to be optimized. The following route table, Table 12, is obtained.

TABLE 12

Route Table of the First Section to be Optimized After Destination Initialization

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| $k_4$ | ∞ | — | ∞ | — |
| $k_5$ | ∞ | — | ∞ | — |
| $k_6$ | ∞ | — | ∞ | — |
| $k_7$ | ∞ | — | ∞ | — |
| $k_8$ | 0 | — | 0 | — |

TABLE 13

List 1
List 1 Storing Already Optimized Segments

| $+k_8$ | $-k_8$ | | | |
|---|---|---|---|---|

The optimization of the current section is based on the condition of FIG. 11. In optimization step 1, list 1 and list 2 have the following appearance.

TABLE 14

List 1 for Storing Already Optimized Segments

| $+k_8$ | $-k_8$ | | | |
|---|---|---|---|---|

TABLE 15

List 2 for Storing the Segments to be Tested in the Next Step

| | | | | |
|---|---|---|---|---|

Figure 13:
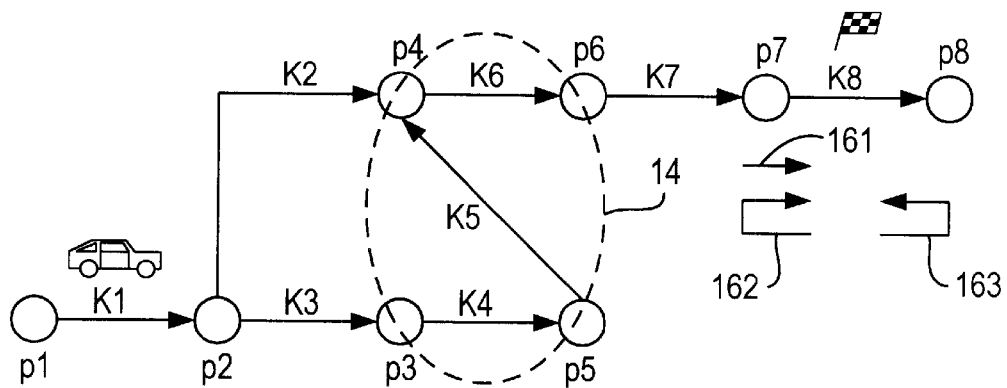

Optimization steps O1$a$ 161, O1$b$ 162 and O1$c$ 163, illustrated in FIG. 13, are performed in optimization step 1. Optimization step O1$a$ 161 gives the following new value for the arrival segment +$k_7$ from the road distance of this segment and the route table entry of the current segment:

$$R_{RT_{Neu},Ank(+k_7)} = R_{RT,Ist(+k_8)} + R_{Kante,Ank(+K_7)}$$

$$R_{RT_{Neu},Ank(+k_7)} = 0 + 10$$

$$R_{RT_{Neu},Ank(+k_7)} = 10$$

["Neu"=new; "Ank"=arrival; "ist"=current; "Kante"= segment–Translator]

The new resistance value of the arrival segment is compared with the old value of this segment using the optimization condition (FIG. 11).

$$R_{RT_{Neu},Ank(+k_7)} < R_{RT_{Alt},Ank(+k_7)}$$

$$10 < \infty$$

The condition is met so that the segment must be optimized. To this end, the new resistance and the follower (current segment) are entered into the route table. No optimization of arrival segments +$k_8$ and −$k_8$ is carried out in steps O11$b$ 162 and O1$c$ 163, because the destination segments always have the lowest resistance. Thus, after optimization step 1, the situation of the route table and lists 1 and 2 is as shown in Tables 16 to 18.

TABLE 16

Route Table After Optimization Step 1

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| $k_4$ | ∞ | — | ∞ | — |
| $k_5$ | ∞ | — | ∞ | — |
| $k_6$ | ∞ | — | ∞ | — |
| $k_7$ | 10 | $+k_8$ | ∞ | — |
| $k_8$ | 0 | — | 0 | — |

TABLE 17

List 1 After Optimization Step 1

| | | | | |
|---|---|---|---|---|

TABLE 18

List 2 After Optimization Step 1

| $+k_7$ | | | | |
|---|---|---|---|---|

For the next optimization step 2, lists 1 and 2 are switched as shown in Tables 19 and 20.

TABLE 19

List 1 Before Optimization Step 2

| $+k_7$ | | | | |
|---|---|---|---|---|

TABLE 20

List 2 Before Optimization Step 2

| | | | | |
|---|---|---|---|---|
| | | | | |

Figure 14:
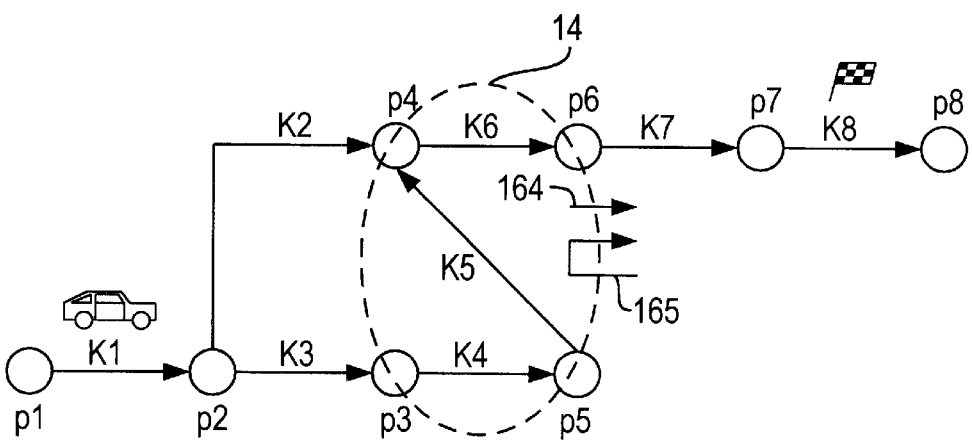
FIG. 14 to FIG. 22 are different illustrations of optimization steps.

In optimization step 2, the optimization steps O2*a* 164 and O2*b* 165 illustrated in FIG. 14 are performed for the segments indicated in the following Table 21.

TABLE 21

Optimization Step 2

| Optimization Step | Current Seg. | Arrival Seg. |
|---|---|---|
| O2a | $+k_7$ | $-k_7$ |
| O2b | $+k_7$ | $+k_8$ |

Optimization steps O2*a* 164 and O2*b* 165 in essence are equivalent to those of optimization step 1 so that they must not be carried out in detail. After optimization step 2, the situation of the route table and Lists 1 and 2 is as shown in Tables 22 to 24.

TABLE 22

Route Table After Optimization Step 2

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| $k_4$ | ∞ | — | ∞ | — |
| $k_5$ | ∞ | — | ∞ | — |
| $k_6$ | 20 | $+k_7$ | ∞ | — |
| $k_7$ | 10 | $+k_8$ | 20 | $+k_7$ |
| $k_8$ | 0 | — | 0 | — |

TABLE 23

List 1 After Optimization Step 2

| | | | | |
|---|---|---|---|---|
| | | | | |

TABLE 24

List 2 After Optimization Step 2

| $+k_6$ | $-k_7$ | | | |
|---|---|---|---|---|

For the next optimization step 3, list 1 and list 2 are again switched as shown in Tables 25 and 26.

TABLE 25

List 1 Before Optimization Step 3

| $+k_6$ | $-k_7$ | | | |
|---|---|---|---|---|

TABLE 26

List 2 Before Optimization Step 3

| | | | | |
|---|---|---|---|---|
| | | | | |

Figure 15:
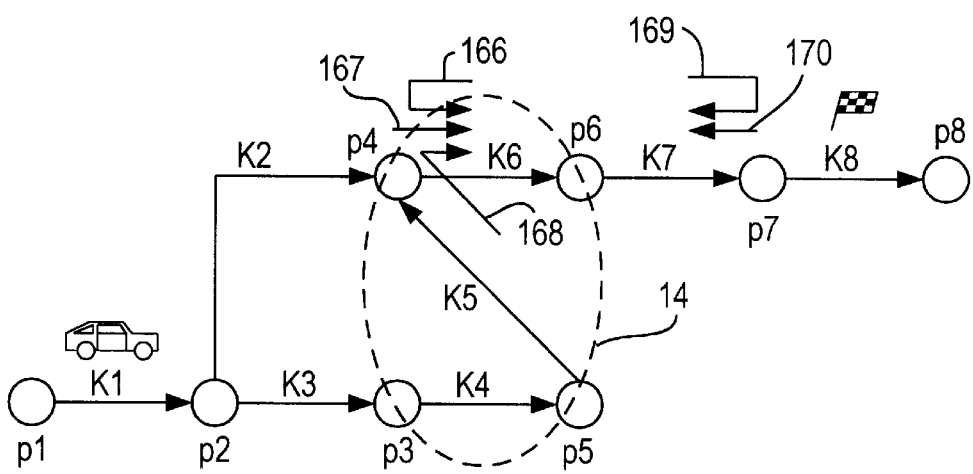

In optimization step 3, the optimization steps O3*a* 166, O3*b* 167, O3*c* 168, O3*d* 169 and O3*e* 170, illustrated in FIG. 15, are carried out with the segments indicated in the following Table 27.

TABLE 27

Optimization Step 3

| Optimization Step | Current Seg. | Arrival Seg. |
|---|---|---|
| O3a | $+k_8$ | $-k_8$ |
| O3b | $+k_6$ | $+k_2$ |
| O3c | $+k_6$ | $+k_5$ |
| O3d | $-k_7$ | $+k_7$ |
| O3e | $-k_7$ | $-k_8$ |

For the arrival segment $+k_7$ and the current segment $-k_7$ (O3*d* 169), the following new value for the current segment is obtained from the road distance value and the route table entry of the current segment:

$$R_{RT_{Neu},Ank(+k_7)} = R_{RT,Ist(-k_7)} + R_{Kante,Ank(+k_7)}$$

$$R_{RT_{Neu},Ank(+k_7)} = 20 + 10$$

$$R_{RT_{Neu},Ank(+k_7)} = 30$$

["Neu"=new; "Ank"=arrival; "ist" current; "Kante"= segment−Translator]

The new resistance value for the arrival segment is compared with the old value of this segment using the optimization condition (FIG. 11)

$$R_{RT_{Neu},Ank(+k_7)} < R_{RT_{Alt},Ank(+k_7)}$$

30<10

Because the condition is not met, no optimization is done. Optimization of arrival segment $-k_8$ (O3*e* 170) is not carried out, because the destination segments always have the lowest resistance. After optimization step 3, the situation of the route table and lists 1 and 2 is shown in Tables 28 to 30.

TABLE 28

Route Table After Optimization Step 3

| Segment | +Resistance | +Follower Seg. | −Resistance | −Follower Seg. |
|---|---|---|---|---|
| $k_1$ | ∞ | — | ∞ | — |
| $k_2$ | 35 | $+k_6$ | ∞ | — |
| $k_3$ | ∞ | — | ∞ | — |
| $k_4$ | ∞ | — | ∞ | — |
| $k_5$ | 30 | $+k_6$ | ∞ | — |
| $k_6$ | 20 | $+k_7$ | 30 | $+k_6$ |
| $k_7$ | 10 | $+k_8$ | 20 | $+k_7$ |
| $k_8$ | 0 | — | 0 | — |

TABLE 29

List 1 After Optimization Step 3

|  |  |  |  |  |
|--|--|--|--|--|
|  |  |  |  |  |

TABLE 30

List 2 After Optimization Step 3

| $+k_2$ | $+k_5$ | $-k_6$ |  |  |
|--|--|--|--|--|

For the next optimization step 4, lists 1 and 2 are again switched as shown in Tables 31 and 32.

TABLE 31

List 1 Before Optimization Step 4

| $+k_2$ | $+k_5$ | $-k_6$ |  |  |
|--|--|--|--|--|

TABLE 32

List 2 Before Optimization Step 4

|  |  |  |  |  |
|--|--|--|--|--|

Figure 16:
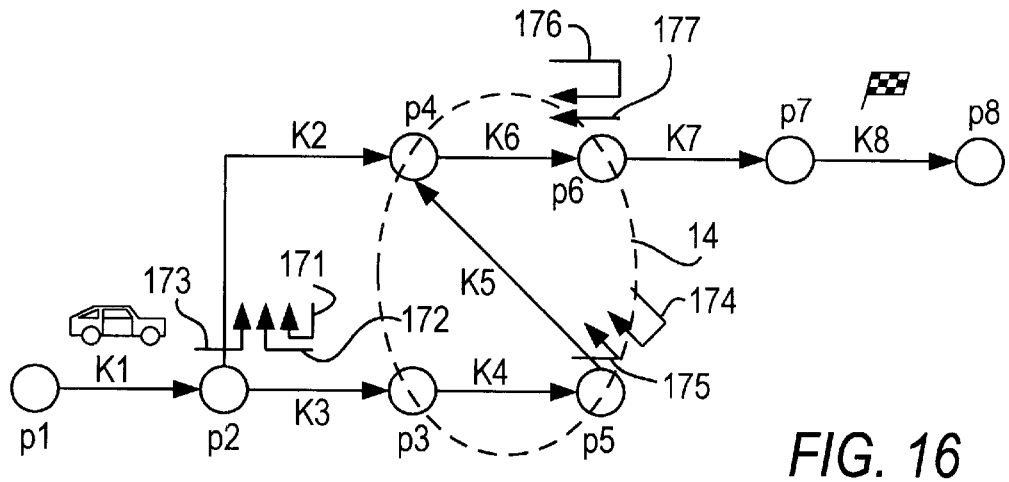

In optimization step 4, the optimization steps O4a 171, O4b 172, O4c 173, O4d 174, O4e 175, O4f 176 and O4g 177, illustrated in FIG. 16, are carried out with the segments indicated in the following Table 33.

TABLE 33

Optimization Step 4

| Optimization Step | Current Seg. | Arrival Seg. |
|--|--|--|
| O4a | $+k_2$ | $-k_2$ |
| O4b | $+k_2$ | $-k_3$ |
| O4c | $+k_2$ | $+k_1$ |
| O4d | $+k_5$ | $-k_5$ |
| O4e | $+k_5$ | $+k_4$ |
| O4f | $-k_6$ | $+k_6$ |
| O4g | $-k_6$ | $-k_7$ |

For the arrival segments $+k_2$ and $+k_6$ (O4a to O4e), it is necessary to perform an optimization. For arrival segment $-k_6$ (O4f and O4g), no optimization is needed, because the updated resistance of the arrival segment in the route table is lower than the new one. After optimization step 4, the situation of the route table and lists 1 and 2 is as shown in Tables 34 to 36.

TABLE 34

Route Table After Optimization Step 4

| Segment | +Resistance | +Follower Seg. | −Resistance | −Follower Seg. |
|--|--|--|--|--|
| $k_1$ | 45 | $+k_2$ | ∞ | — |
| $k_2$ | 35 | $+k_6$ | 60 | $+k_2$ |
| $k_3$ | ∞ | — | 45 | $+k_2$ |

TABLE 34-continued

Route Table After Optimization Step 4

| Segment | +Resistance | +Follower Seg. | −Resistance | −Follower Seg. |
|--|--|--|--|--|
| $k_4$ | 40 | $+k_5$ | ∞ | — |
| $k_5$ | 30 | $+k_6$ | 40 | $+k_5$ |
| $k_6$ | 20 | $+k_7$ | 30 | $+k_6$ |
| $k_7$ | 10 | $+k_8$ | 20 | $+k_7$ |
| $k_8$ | 0 | — | 0 | — |

TABLE 35

List 1 After Optimization Step 4

|  |  |  |  |  |
|--|--|--|--|--|
|  |  |  |  |  |

TABLE 36

List 2 After Optimization Step 4

| $+k_1$ | $-k_2$ | $-k_3$ | $+k_4$ | $-k_5$ |
|--|--|--|--|--|

For the next optimization step 5, lists 1 and 2 are again switched as shown in Tables 37 and 38.

TABLE 37

List 1 Before Optimization Step 5

| $+k_1$ | $-k_2$ | $-k_3$ | $+k_4$ | $-k_5$ |
|--|--|--|--|--|

TABLE 38

List 2 Before Optimization Step 5

|  |  |  |  |  |
|--|--|--|--|--|

Figure 17:
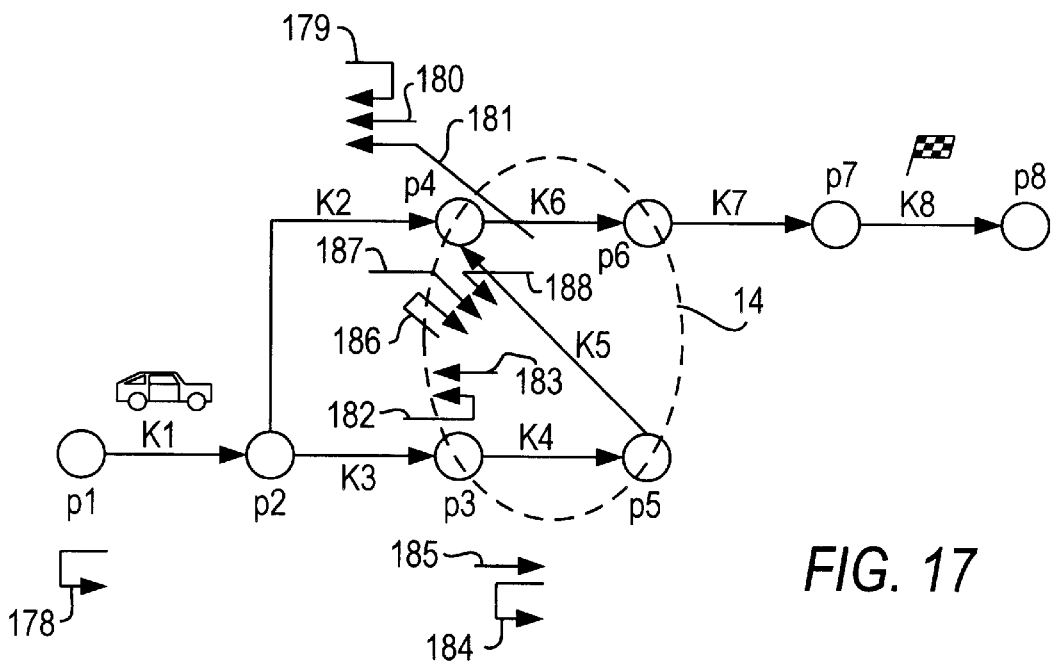

In optimization step 5, the optimization steps O5a 178, O5b 179, O5c 180, O5d 181, O5e 182, O5f 183, O5g 184, O5h 185, O5i 186, O5k 187 and O5l 188, illustrated in FIG. 17, are performed with the segments indicated in the following Table 39.

TABLE 39

Optimization Step 5

| Optimization Step | Current Seg. | Arrival Seg. |
|--|--|--|
| O5a | $+k_1$ | $-k_1$ |
| O5b | $-k_2$ | $+k_2$ |
| O5c | $-k_2$ | $-k_6$ |
| O5d | $-k_2$ | $+k_5$ |
| O5e | $-k_3$ | $+k_3$ |
| O5f | $-k_3$ | $-k_4$ |
| O5g | $+k_4$ | $-k_4$ |
| O5h | $+k_4$ | $+k_3$ |
| O5i | $-k_5$ | $+k_5$ |
| O5k | $-k_5$ | $+k_2$ |
| O5l | $-k_5$ | $-k_6$ |

Optimization is needed for arrival segment $-k_1$ and current segment $+k_1$ (O5$a$), because the resistance of this arrival segment still has a an infinite value. For the arrival segments and current segments of optimization steps O5$b$ to O5$d$, no optimization is necessary, because the current resistance of the particular arrival segment in the route table is lower than the new resistance. For the arrival segments and current segments of optimization steps O5$e$ and O5$f$ optimization is necessary, because the resistance of the particular arrival segment still has an infinite value.

After optimization steps O5$a$ to O5$f$, the situation of the route table is as shown in Table 40.

TABLE 40

Intermediate Situation of the Route Table in Optimization Step 5

| Segment | +Resistance | +Follower Seg. | −Resistance | −Follower Seg. |
|---|---|---|---|---|
| $k_1$ | 45 | $+k_2$ | 55 | $+k_1$ |
| $k_2$ | 35 | $+k_6$ | 60 | $+k_2$ |
| $k_3$ | 55 | $-k_3$ | 45 | $+k_2$ |
| $k_4$ | 40 | $+k_5$ | 55 | $-k_3$ |
| $k_5$ | 30 | $+k_6$ | 40 | $+k_5$ |
| $k_6$ | 20 | $+k_7$ | 30 | $+k_6$ |
| $k_7$ | 10 | $+k_8$ | 20 | $+k_7$ |
| $k_8$ | 0 | — | 0 | — |

In the following optimization steps O5$g$ and O5$h$, arrival segments $+k_3$ and $-k_4$ once again represent arrival segments. For arrival segments $-k_4$ and $+k_3$ and the current segment $+k_4$, the following new values are obtained from the road distance value of these segments and the route table entry of the current segment:

$$R_{RT_{Neu},Ank(-k_4)} = R_{RT,Ist(+k_4)} + R_{Kante,Ank(-k_4)}$$

$$R_{RT_{Neu},Ank(-k_4)} = 40 + 10$$

$$R_{RT_{Neu},Ank(-k_4)} = 50$$

$$R_{RT_{Neu},Ank(+k_3)} = R_{RT,Ist(+k_4)} + R_{Kante,Ank(+k_3)}$$

$$R_{RT_{Neu},Ank(+k_3)} = 40 + 10$$

$$R_{RT_{Neu},Ank(+k_3)} = 50$$

["Neu"=new; "ist"=current; "Kante"=segment; "Ank"= arrival–Translator]

The new resistance value of the arrival segments is compared with the old value of these segments using the optimization condition (FIG. 11).

$$R_{RT_{Neu},Ank(-k_4)} < R_{RT_{Alt},Ank(-k_4)}$$

50<55

$$R_{RT_{Neu},Ank(+k_3)} < R_{RT_{Alt},Ank(+k_3)}$$

50<55

Because the condition is met, an optimization is required in both cases.

For the arrival segments and current segments of optimization steps O5$i$ to O5$k$, there is no need for optimization, because the current resistance of the particular arrival segment in the route table is lower than the new resistance. After optimization step 5, the situation of the route table and lists 1 and 2 is as shown in Tables 41 to 43.

TABLE 41

Route Table After Optimization Step 5

| Segment | +Resistance | +Follower Seg. | −Resistance | −Follower Seg. |
|---|---|---|---|---|
| $k_1$ | 45 | $+k_2$ | 55 | $+k_1$ |
| $k_2$ | 35 | $+k_6$ | 60 | $+k_2$ |
| $k_3$ | 50 | $+k_4$ | 45 | $+k_2$ |
| $k_4$ | 40 | $+k_5$ | 50 | $+k_4$ |
| $k_5$ | 30 | $+k_8$ | 40 | $+k_5$ |
| $k_6$ | 20 | $+k_7$ | 30 | $+k_6$ |
| $k_7$ | 10 | $+k_8$ | 20 | $+k_7$ |
| $k_8$ | 0 | — | 0 | — |

TABLE 42

List 1 After Optimization Step 5

|  |  |  |  |  |
|---|---|---|---|---|
|  |  |  |  |  |

TABLE 43

List 2 After Optimization Step 5

| $-k_1$ | $+k_3$ | $-k_4$ |  |  |
|---|---|---|---|---|

For the next optimization step 5 [sic—"step 6" is—Translator], lists 1 and 2 are again switched as shown in Tables 37 and 38 [sic—Tables 44 and 45 are mente—Translator].

TABLE 44

List 1 Before Optimization Step 6

| $-k_1$ | $+k_3$ | $-k_4$ |  |  |
|---|---|---|---|---|

TABLE 45

List 2 Before Optimization Step 6

|  |  |  |  |  |
|---|---|---|---|---|

Figure 18:
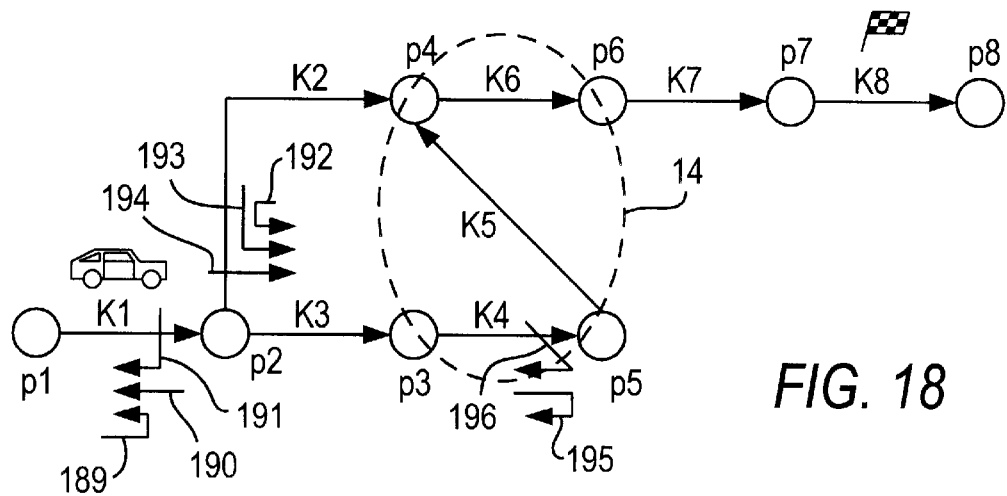

In optimization step 6, the optimization steps O6$a$ 189, O6$b$ 190, O6$c$ 191, O6$d$ 192, O6$e$ 193, O6$f$ 194, O6$g$ 195 and O6$h$ 196, illustrated in FIG. 18, are carried out with the segments indicated in the following Table 46.

TABLE 46

Optimization Step 6

| Optimization Step | Current Seg. | Arrival Seg. |
|---|---|---|
| O6a | $-k_1$ | $+k_1$ |
| O6b | $-k_1$ | $-k_3$ |
| O6c | $-k_1$ | $-k_2$ |
| O6d | $+k_3$ | $-k_3$ |
| O6e | $+k_3$ | $-k_2$ |
| O6f | $+k_3$ | $+k_1$ |

TABLE 46-continued

Optimization Step 6

| Optimization Step | Current Seg. | Arrival Seg. |
|---|---|---|
| O6g | $-k_4$ | $+k_4$ |
| O6h | $-k_4$ | $-k_5$ |

In none of the optimization steps O6a to O6h is the optimization condition met, so that no further optimization takes place. After optimization step 6, the situation of the route table and lists 1 and 2 is as shown in Tables 47 to 49.

TABLE 47

Route Table After Optimization Step 6

| Segment | +Resistance | +Follower Seg. | −Resistance | −Follower Seg. |
|---|---|---|---|---|
| $k_1$ | 45 | $+k_2$ | 55 | $+k_1$ |
| $k_2$ | 35 | $+k_8$ | 60 | $+k_2$ |
| $k_3$ | 50 | $+k_4$ | 45 | $+k_2$ |
| $k_4$ | 40 | $+k_5$ | 50 | $+k_4$ |
| $k_5$ | 30 | $+k_6$ | 40 | $+k_5$ |
| $k_6$ | 20 | $+k_7$ | 30 | $+k_6$ |
| $k_7$ | 10 | $+k_8$ | 20 | $+k_7$ |
| $k_8$ | 0 | — | 0 | — |

TABLE 48

List 1 After Optimization Step 6

[empty boxes]

TABLE 49

List 2 After Optimization Step 6

[empty boxes]

After optimization step 6, list 2 and thus list 1 of the segments to be tested are empty so that the end criterion for the first section of the via area route search is met and terminated. The route table for this section (Table 47) is saved.

After the optimization of all segments of the graph of the current section, the resistance values and the followers of the via area of the last section are updated in the VADL. These values represent the starting point for the optimization of the next-to be-optimized section. The following VAL is obtained, as shown in Tables 50 and 51.

TABLE 50

Via Area Index Table (VAIT) After Optimization of the First Section

| Via Area Index | Reference to VADL | Route Table |
|---|---|---|
| — | — | 1 |
| 1 | 2 | 2 |
| 2 | 1 | — |

TABLE 51

Via Area Description List (VADL)
After Optimization of the First Section

| Index | Segment | Next Index | Via Area Index | +Resistance | −Resistance |
|---|---|---|---|---|---|
| 1 | $k_8$ | — | 2 | 0 | 0 |
| 2 | $k_4$ | 3 | 1 | 40 | 50 |
| 3 | $k_5$ | 4 | 1 | 30 | 40 |
| 4 | $k_6$ | — | 1 | 20 | 30 |

For the second optimization section starting from the via area, first the original initialization of the route table is again performed in the condition shown in Table 52, the resistance being set equal to infinity and the followed being cancelled.

TABLE 52

Original Initialization of Route Table
of the Second Optimization Section

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| $k_4$ | ∞ | — | ∞ | — |
| $k_5$ | ∞ | — | ∞ | — |
| $k_6$ | ∞ | — | ∞ | — |
| $k_7$ | ∞ | — | ∞ | — |
| $k_8$ | ∞ | — | ∞ | — |

After this original initialization of the route table, the resistance of the segments of the last via area is entered from the VADL into the table, and the segments are taken up into the list of segments to be optimized. The route table shown in Table 53 is obtained.

TABLE 53

Route Table of the Second Optimization Section After
Initialization of the Via Area

| Segment | +Resistance | +Follower Seg. | −Resistance | −Follower Seg. |
|---|---|---|---|---|
| $k_1$ | ∞ | — | ∞ | — |
| $k_2$ | ∞ | — | ∞ | — |
| $k_3$ | ∞ | — | ∞ | — |
| $k_4$ | 40 | — | 50 | — |
| $k_5$ | 30 | — | 40 | — |
| $k_6$ | 20 | — | 30 | — |
| $k_7$ | ∞ | — | ∞ | — |
| $k_8$ | ∞ | — | ∞ | — |

Moreover, the segments assigned to via area 14 are entered into list 1 as shown in Table 54. List 2 shown in Table 55 is still empty.

TABLE 54

List 1 for Storing Already Optimized Segments

| $+k_4$ | $-k_4$ | $+k_5$ | $-k_5$ | $+k_6$ | $-k_6$ | |

TABLE 55

List 2 for Storing the Segments to be Tested in the Next Step

|  |  |  |  |  |  |
|--|--|--|--|--|--|

Figure 19:
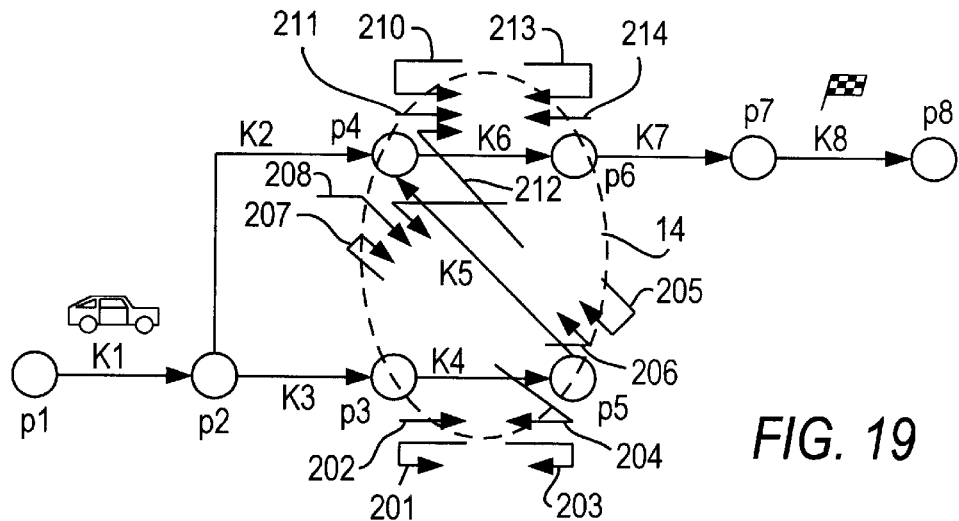

In the optimization of the second section, once again the condition of FIG. 11 is used. In optimization step 7 are performed optimization steps O7a 201, O7b 202, O7c 203, O7d 204, O7e 205, O7f 206, O7g 207 and O7h 208, O7i 209, O7k 210, O7l 211, O7m 212, O7n 213 and O7o 214, illustrated in FIG. 19, with the segments indicated in the following Table 56.

TABLE 56

Optimization Step 7

| Optimization Step | Current Seg. | Arrival Seg. |
|---|---|---|
| O7a | $+k_4$ | $-k_4$ |
| O7b | $+k_4$ | $+k_3$ |
| O7c | $-k_4$ | $+k_4$ |
| O7d | $-k_4$ | $-k_5$ |
| O7e | $+k_5$ | $-k_5$ |
| O7f | $+k_5$ | $+k_4$ |
| O7g | $-k_5$ | $+k_5$ |
| O7h | $-k_5$ | $+k_2$ |
| O7i | $-k_5$ | $-k_6$ |
| O7k10 | $+k_6$ | $-k_6$ |
| O7l11 | $+k_6$ | $+k_2$ |
| O7m12 | $+k_6$ | $+k_5$ |
| O7n13 | $-k_6$ | $+k_6$ |
| O7o14 | $-k_6$ | $-k_7$ |

As far as optimization steps O7a 201 and O7b 202 are concerned, optimization is needed only for arrival segment $+k_3$ (O7b 202), because this arrival segment still shows an infinite resistance. For arrival segment $-k_4$ (O7a 201), the resistance cannot improve, because this segment was already optimized in the preceding section. In optimization steps O7c 203 and O7d 204, there is no need to optimize arrival segments $+k_4$ and $-k_6$, because these arrival segments have already been optimized as segments of the last via area. The same applies to optimization steps O7e 205 and O7f 206 with arrival segments $+k_4$ and $-k_6$. For arrival segments $+k_6$ and $-k_6$ of optimization steps O7g 207 and O7i 209, there is no need for optimization, because these arrival segments have already been optimized as segments of the last via area. For arrival segment $+k_2$ of optimization step O7h 208, the following new value is obtained from the road distance value of this segment and the route table entry of the current segment $-k_5$:

$R_{RT_{Neu},Ank(+k_2)} = R_{RT,Ist(-k_5)} + R_{Kante,Ank(+k_2)}$ $R_{RT_{Neu},Ank(+k_2)} = 40+10$ $R_{RT_{Neu},Ank(+k_2)} = 50$

["ist"=current; "Neu"=new; "Kante"=segment; "Ank"= arrival–Translator]

The new resistance value of the arrival segment is compared with the old value for this segment using the optimization condition (FIG. 11).

$R_{RT_{Neu},Ank(+k_2)} < R_{RT_{Alt},Ank(+k_2)}$ $50 < \infty$

The condition is met so that this segment must be optimized.

For arrival segments +k and $-k_6$ of optimization steps O7k 210 and O7m 212, there is no need for optimization, because these arrival segments are already optimal as segments of the last via area. For arrival segment $+k_2$ of optimization step O7l 211, the following new value is obtained from the road distance value of this segment and the route table entry of the current segment $+k_6$:

$R_{RT_{Neu},Ank(+k_2)} = R_{RT,Ist(+k_6)} + R_{Kante,Ank(+k_2)}$ $R_{RT_{Neu},Ank(+k_2)} = 30+10$ $R_{RT_{Neu},Ank(+k_2)} = 40$

["ist"=current; "Neu"=new; "Kante"=segment; "Ank"= arrival–Translator]

The new resistance value of the arrival segment is compared with the old value for this segment using the optimization condition (FIG. 11).

$R_{RT_{Neu},Ank(+k_2)} < R_{RT_{Alt},Ank(+k_2)}$ $40 < 50$

The condition is met, and the segment must be optimized.

As regards the current segment $-k_6$ (optimization steps O7n 213 and O7o 214), optimization is found to be necessary only for arrival segment $-k_7$ (O7o 214), because this arrival segment still shows an infinite resistance. For arrival segment $+k_8$ (O7n 213), the resistance cannot improve, because this arrival segment has already been optimized in the preceding, first section.

Thus, after optimization step 7, the situation of the route table and lists 1 and 2 is as shown in Tables 57 to 59.

TABLE 57

Route Table After Optimization Step 7

| Segment | +Resistance | +Follower Seg. | −Resistance | −Follower Seg. |
|---|---|---|---|---|
| $k_1$ | ∞ | — | ∞ | — |
| $k_2$ | 35 | $+k_6$ | ∞ | — |
| $k_3$ | 50 | $+k_4$ | ∞ | — |
| $k_4$ | 40 | — | 50 | — |
| $k_5$ | 30 | — | 40 | — |
| $k_6$ | 20 | — | 30 | — |
| $k_7$ | ∞ | — | 40 | $-k_6$ |
| $k_8$ | ∞ | — | ∞ | — |

TABLE 58

List 1 After Optimization Step 7

|  |  |  |  |  |  |
|--|--|--|--|--|--|

TABLE 59

List 2 After Optimization Step 7

| $+k_2$ | $+k_3$ | $-k_7$ |  |  |  |
|--|--|--|--|--|--|

For the next optimization step 8, lists 1 and 2 are again switched as shown in Tables 60 and 61.

TABLE 60

List 1 Before Optimization Step 8

| +k₂ | +k₃ | -k₇ | | | | |
|---|---|---|---|---|---|---|

TABLE 61

List 2 Before Optimization Step 8

| | | | | | | |
|---|---|---|---|---|---|---|

Figure 20:
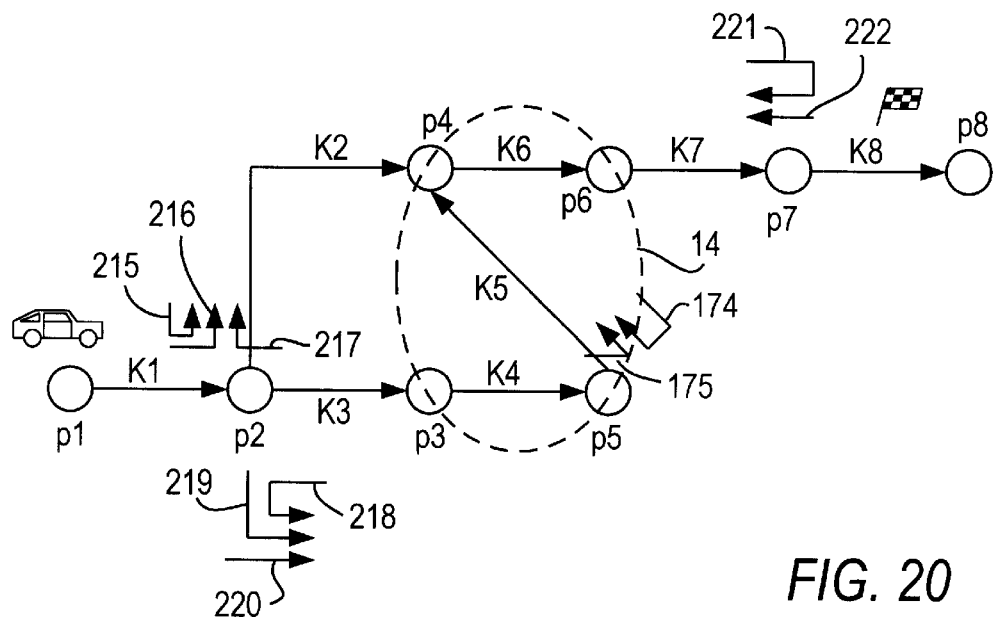

In optimization step 8, the optimization steps O8a 178, O8b 179, O8c 180, O8d 181, O8e 182, O8f 183, O8g 184 and O8h 185, illustrated in FIG. 20, are carried out with the segments indicated in the following Table 62.

TABLE 62

Optimization Step 8

| Optimization Step | Current Seg. | Arrival Seg. |
|---|---|---|
| O8a | +k₂ | -k₂ |
| O8b | +k₂ | +k₁ |
| O8c | +k₂ | -k₃ |
| O8d | +k₃ | -k₃ |
| O8e | +k₃ | -k₂ |
| O8f | +k₃ | +k₁ |
| O8g | -k₇ | +k₇ |
| O8h | -k₇ | -k₈ |

For the arrival segments of the optimization steps O7a 215 to O7c 217, optimization is necessary, because the resistance of these particular arrival segments is still infinite. The same is true for arrival segment -k₃ of optimization step O8d 218. For arrival segment -k₂ of optimization step O8e 219, the following new value is obtained from the road distance value of this segment and the route table entry of the current segment +k₃:

$$R_{RT_{Neu},Ank(-k_2)} = R_{RT,Ist(+k_3)} + R_{Kante,Ank(-k_2)}$$

$$R_{RT_{Neu},Ank(-k_2)} = 50 + 15$$

$$R_{RT_{Neu},Ank(-k_2)} = 65$$

["Neu"=new; "ist"=current; "Kante"=segment; "Ank"= arrival–Translator]

The new resistance value of the arrival segment is compared with the old value for this segment using the optimization condition (FIG. 11).

$$R_{RT_{Neu},Ank(-k_2)} < R_{RT_{Alt},Ank(-k_2)}$$

65<50

Because the condition is not met, the segment must not be optimized. Similarly, the same result is arrived at for arrival segment +k₁ of optimization step O8f 220. Optimization is also necessary for the arrival segments and current segments of optimization steps O8g 221 and O8h 222, because the resistance of the particular arrival segments is still infinite.

After optimization step 8, the situation of the route table and lists 1 and 2 is as shown in Tables 63 to 65.

TABLE 63

Route Table After Optimization Step 8

| Segment | +Resistance | +Follower Seg. | –Resistance | –Follower Seg. |
|---|---|---|---|---|
| k₁ | 45 | +k₂ | ∞ | — |
| k₂ | 35 | +k₆ | 50 | +k₂ |
| k₃ | 50 | +k₄ | 45 | +k₂ |
| k₄ | 40 | — | 50 | — |
| k₅ | 30 | — | 40 | — |
| k₆ | 20 | — | 30 | — |
| k₇ | 50 | +k₇ | 40 | -k₆ |
| k₈ | ∞ | — | 50 | -k₇ |

TABLE 64

List 1 After Optimization Step 8

| | | | | | | |
|---|---|---|---|---|---|---|

TABLE 65

List 2 After Optimization Step 8

| +k₁ | -k₂ | -k₃ | +k₇ | -k₈ | | |
|---|---|---|---|---|---|---|

For the next optimization step 8 [sic—"step 9" is meant—Translator], lists 1 and 2 are again switched as shown in Tables 66 and 67.

TABLE 66

List 1 Before Optimization Step 9

| +k₁ | -k₂ | -k₃ | +k₇ | -k₈ | | |
|---|---|---|---|---|---|---|

TABLE 67

List 2 Before Optimization Step 9

| | | | | | | |
|---|---|---|---|---|---|---|

Figure 21:
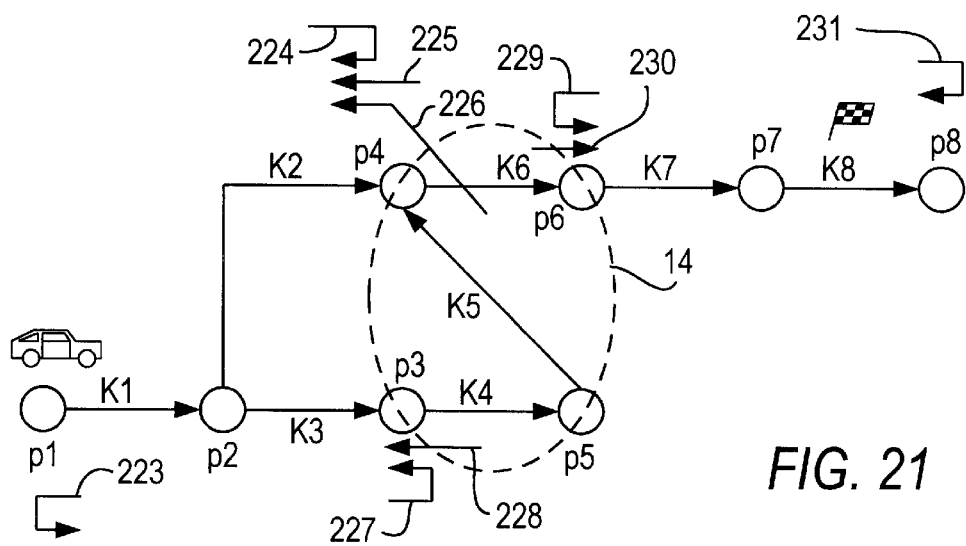

In optimization step 9, the optimization steps O9a 223, O9b 224, O9c 225, O9d 226, O9e 227, O9f 228, O9g 229, O9h 230 and O9i 231, illustrated in FIG. 21, are performed with the segments indicated in the following Table 67.

TABLE 67

Optimization Step 9

| Optimization Step | Current Seg. | Arrival Seg. |
|---|---|---|
| O9a | +k₁ | -k₁ |
| O9b | -k₂ | +k₂ |
| O9c | -k₂ | -k₆ |
| O9d | -k₂ | +k₅ |
| O9e | -k₃ | +k₃ |
| O9f | -k₃ | -k₄ |
| O9g | +k₇ | -k₇ |

TABLE 67-continued

Optimization Step 9

| Optimization Step | Current Seg. | Arrival Seg. |
|---|---|---|
| O9h | $+k_7$ | $+k_6$ |
| O9i | $-k_8$ | $+k_8$ |

For arrival segment $-k_1$ of optimization step O9a 223 or the current segment $+k_1$, optimization is necessary because arrival segment $-k_1$ still shows an infinite resistance. For the arrival segments and current segments of optimization steps O9b 224, O9c 225, O9d 226, O9e 227, O9f 228, O9g 229 and O9h 230, no optimization is needed, because the current resistance of the corresponding arrival segments in the route table is lower than the new resistance.

As regards the current segment $-k_8$ (O9i 231), optimization is necessary for the arrival segment $+k_8$, because arrival segment $+k_8$ still shows an infinite resistance.

After optimization step 9, the situation of the route table and lists 1 and 2 is as shown in Tables 68 to 70.

TABLE 68

Route Table After Optimization Step 9

| Segment | +Resistance | +Follower Seg. | −Resistance | −Follower Seg. |
|---|---|---|---|---|
| $k_1$ | 45 | $+k_2$ | 55 | $+k_1$ |
| $k_2$ | 35 | $+k_6$ | 50 | $+k_2$ |
| $k_3$ | 50 | $+k_4$ | 45 | $+k_2$ |
| $k_4$ | 40 | — | 50 | — |
| $k_5$ | 30 | — | 40 | — |
| $k_6$ | 20 | — | 30 | — |
| $k_7$ | 50 | $-k_7$ | 40 | $-k_6$ |
| $k_8$ | 60 | $-k_8$ | 50 | $-k_7$ |

TABLE 69

List 1 After Optimization Step 9

|  |  |  |  |  |  |  |
|---|---|---|---|---|---|---|
|  |  |  |  |  |  |  |

TABLE 70

List 2 After Optimization Step 9

| $-k_1$ | $+k_8$ |  |  |  |  |
|---|---|---|---|---|---|
|  |  |  |  |  |  |

For the next optimization step 10, lists 1 and 2 are again switched as shown in Tables 71 and 72.

TABLE 71

List 1 Before Optimization Step 10

| $-k_1$ | $+k_8$ |  |  |  |  |
|---|---|---|---|---|---|

TABLE 72

List 2 Before Optimization Step 10

|  |  |  |  |  |  |
|---|---|---|---|---|---|

Figure 22:
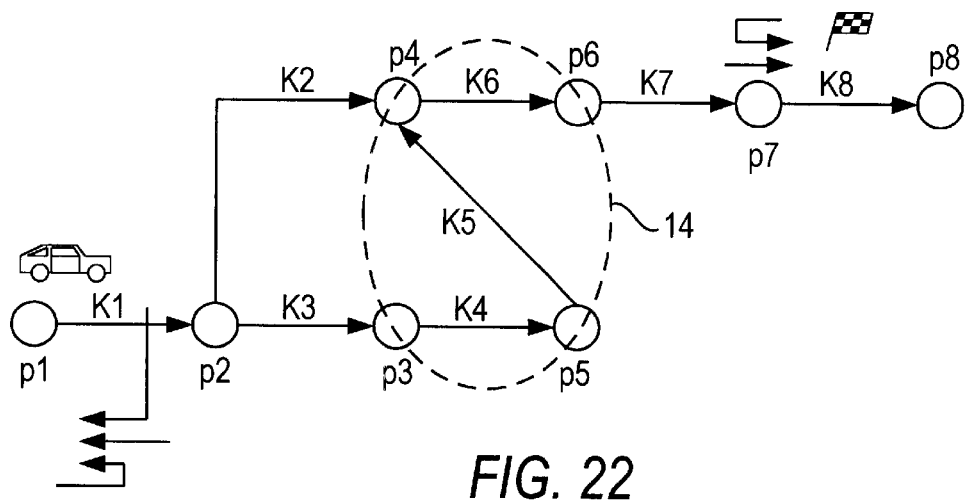

In optimization step 10, the optimization steps O10a 232, O10b 233, O10c 234, O10d 235, O10e 236, illustrated in FIG. 22, are performed with the segments indicated in the following Table 73.

TABLE 73

Optimization Step 10

| Optimization Step | Current Seg. | Arrival Seg. |
|---|---|---|
| O10a232 | $+k_1$ | $-k_1$ |
| O10b233 | $-k_2$ | $+k_2$ |
| O10c234 | $-k_2$ | $-k_6$ |
| O10d235 | $-k_2$ | $+k_5$ |
| O10e236 | $-k_3$ | $+k_3$ |

There is no need for optimization in any of optimization steps O10a to O10e, because the current resistance of the particular arrival segments in the route table is lower than the new resistance.

Thus, after optimization step 10, the situation of the route table and lists 1 and 2 is as shown in Tables 75 to 77.

TABLE 75

Route Table After Optimization Step 10

| Segment | +Resistance | +Follower Seg. | −Resistance | −Follower Seg. |
|---|---|---|---|---|
| $k_1$ | 45 | $+k_2$ | 55 | $+k_1$ |
| $k_2$ | 35 | $+k_6$ | 50 | $+k_2$ |
| $k_3$ | 50 | $+k_4$ | 45 | $+k_2$ |
| $k_4$ | 40 | — | 50 | — |
| $k_5$ | 30 | — | 40 | — |
| $k_6$ | 20 | — | 30 | — |
| $k_7$ | 50 | $-k_7$ | 40 | $-k_6$ |
| $k_8$ | 60 | $-k_8$ | 50 | $-k_7$ |

TABLE 76

List 1 After Optimization Step 10

|  |  |  |  |  |
|---|---|---|---|---|

TABLE 77

List 2 After Optimization Step 10

|  |  |  |  |  |
|---|---|---|---|---|

After optimization step 10, the list of segments to be tested is empty and thus the end criterion for the second and last section of the via area route search according to the invention is met.

The route lists are then put together from the individual route tables of the individual sections and the VAL. Starting from the segment of the current vehicle position, the segments are entered into the route list of the last optimization section in accordance with the follower references in the route table. The procedure thus begins with the route table of the first section as shown in Table 75 from which segment $+k_1$ is taken and entered as the first entry into the route list. Segment $+k_2$ is entered into Table 75 as the follower so that it is written as the second entry into the route list. Segment $+k_6$ is the follower of $+k_2$ and, hence, is entered next into the route list. Segment $+k_6$ has no follower so that the evaluation of the route table of the first section ends as shown in Table 75. The route list then has the content shown in Table 78.

TABLE 78

Route list of the First Route Section

| No. | Segment | +Resist. to Dest. | Follower to Dest. |
|---|---|---|---|
| 1 | $+k_1$ | 45 | $+k_2$ |
| 2 | $+k_2$ | 35 | $+k_8$ |
| 3 | $+k_6$ | 20 | — |
| 4 | | | |
| 5 | | | |
| 6 | | | |

The first via are is reached at the first segment without follower, in this case segment $+k_6$. The route table of the next route section is determined in accordance with the VAIT (Table 50). This is the route table of the second section as shown in Table 47. In this route table (Table 47), the procedure continues with the last-processed segment, namely segment $+k_6$, and the linking in the direction of the destination is continued up to the next segment without follower, namely the sequence of segments $+k_6$, $+k_7$ and $+k_8$. The route list then has the content shown in Table 79.

TABLE 79

Final Route List of the Via Area Route

| No. | Segment | +Resist. to Dest. | Follower to Dest. |
|---|---|---|---|
| 1 | $+k_1$ | 45 | $+k_2$ |
| 2 | $+k_2$ | 35 | $+k_6$ |
| 3 | $+k_6$ | 20 | $+k_7$ |
| 4 | $+k_7$ | 10 | $+k_8$ |
| 5 | $+k_8$ | 0 | — |
| 6 | | | |

Figure 23:
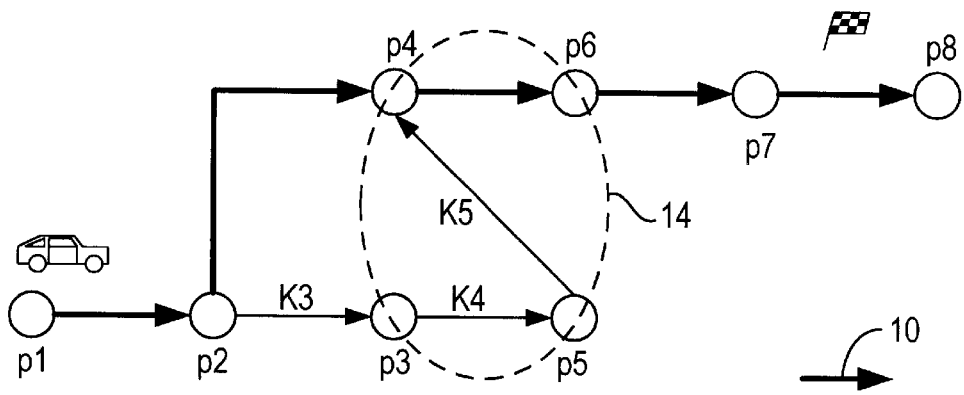
FIG. 23 shows an overall route.

The course of this via area is as shown in FIG. 23.

Figure 24:
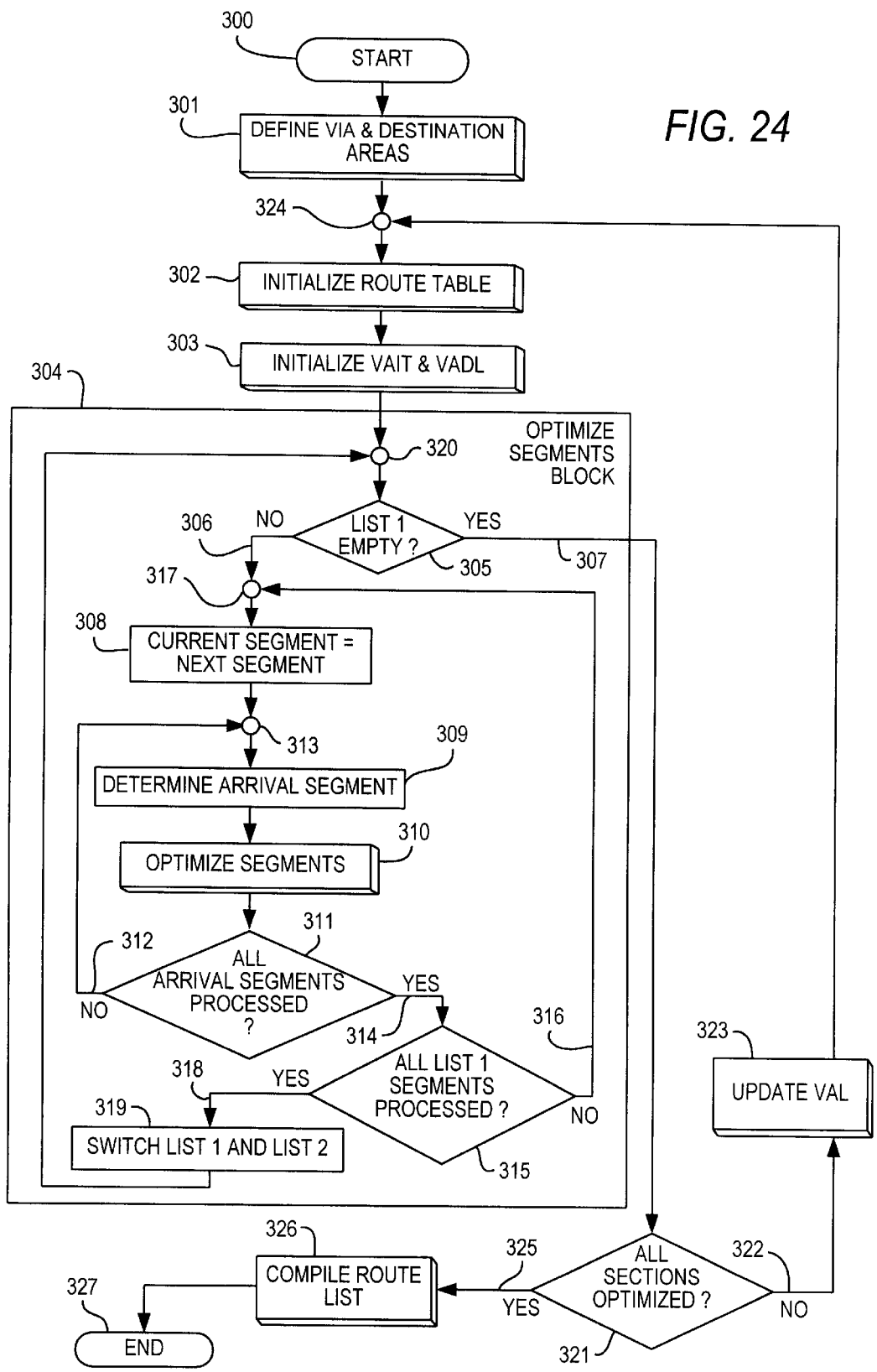
FIG. 24 is a flow diagram of a via area route search method according to the invention.

FIG. 24 illustrates in the form of a flow diagram the method of the invention described in the foregoing by way of a concrete example. The method of the invention starts with step 300. The destination and the via area or via areas are defined in block 301. Also, the VAL with VAIT and VADL is created. The route table of the currently processed section is initialized in block 302. The initialization of VAL with VAIT and VADL occurs in block 303. In 304, the optimization of the segments of a section takes place. In the block 305, the question is asked whether list 1 is empty. If the answer is "NO", the procedure continues along path 306, and if it is "YES" it continues along path 307. In path 306, in block 308, a current segment is determined as the next segment appearing in list 1. In block 309, the arrival segments assigned to this current segment are then determined. In block 310, segment optimization in accordance with the condition of FIG. 11 is carried out. In block 311, it is determined whether all arrival segments have been processed. If the answer is "NO", the procedure continues along path 312 to return to point 313 before block 309. If the answer is "YES", the procedure continues along path 314, and in block 315 the question is asked whether all segments of list 1 have been processed. If the answer is "NO", the procedure returns along path 316 to a point 317 before block 308. If the answer is "YES", the procedure continues along path 318, and in block 319 lists 1 and 2 are switched. The procedure then returns to point 320 before block 305.

If list 1 is found to be empty, the procedure continues along path 307, and in block 321 the question is asked whether all sections have been optimized. If the answer is "NO", path 322 branches off to block 323 where the VAL is updated. The procedure then returns to point 324 ahead of block 302. If the answer in block 321 is "YES", the procedure continues along path 325 to block 326 where the route list is compiled. The procedure then ends in block 327.

Figure 25:
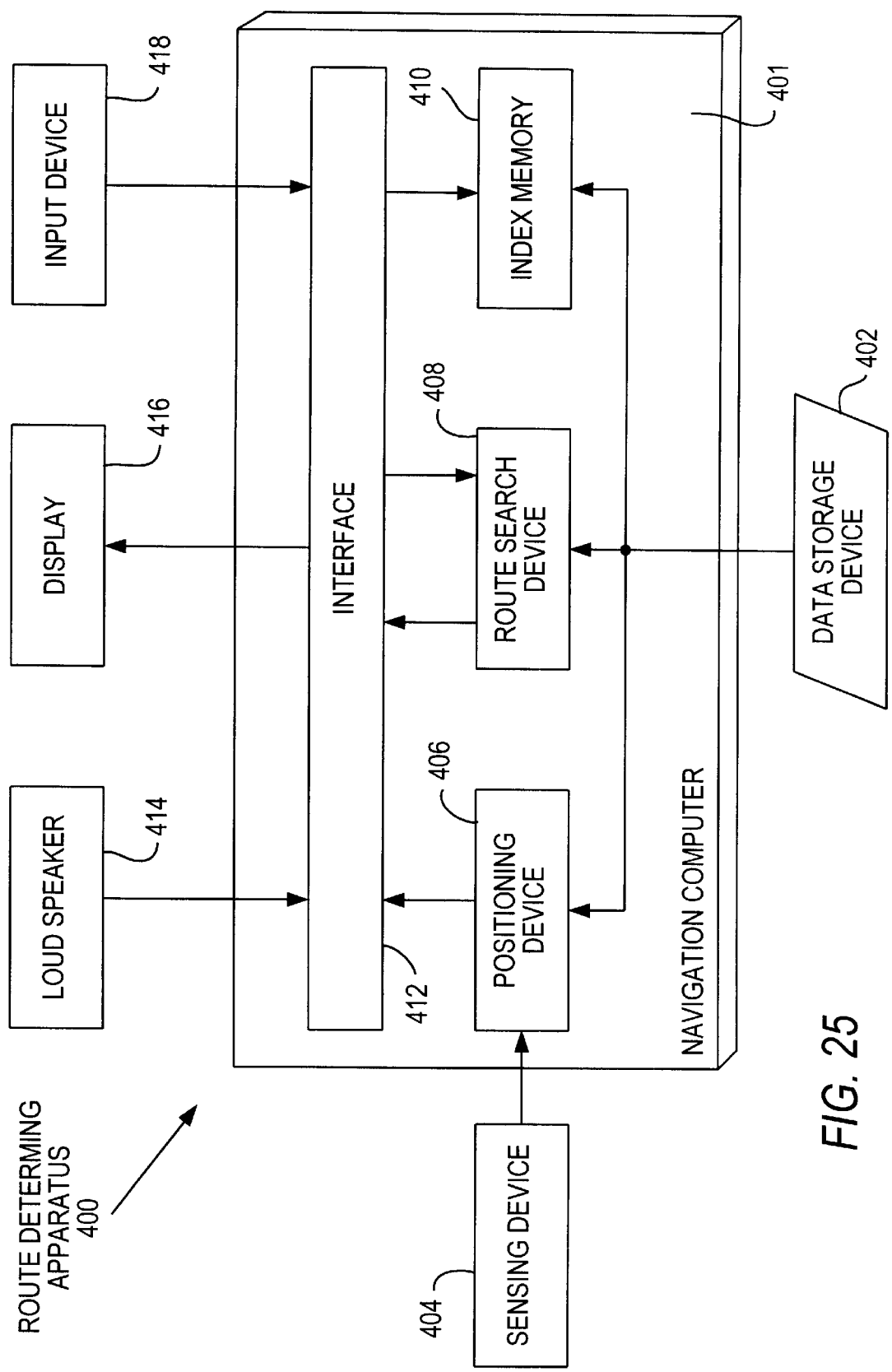
FIG. 25 shows a preferred embodiment of the apparatus for carrying out the method of the invention.

An example of an apparatus 400 for carrying out the method of the invention is shown in FIG. 25. Said apparatus comprises a navigation computer 401, a data storage device 402 which contains the digital map as an image of the real road network, furthermore a sensing device 404, a position-finding device 406, a route-searching device 408, an index memory 410, an interface 412, a loudspeaker 414, a display 416 and an input device 418. Interface 412 is appropriately extended for the input and definition of via areas. Index memory 410 is also appropriately extended to function as a memory for VAL with VAIT and VADL and for the various route tables of the individual sections.

Figure 26:
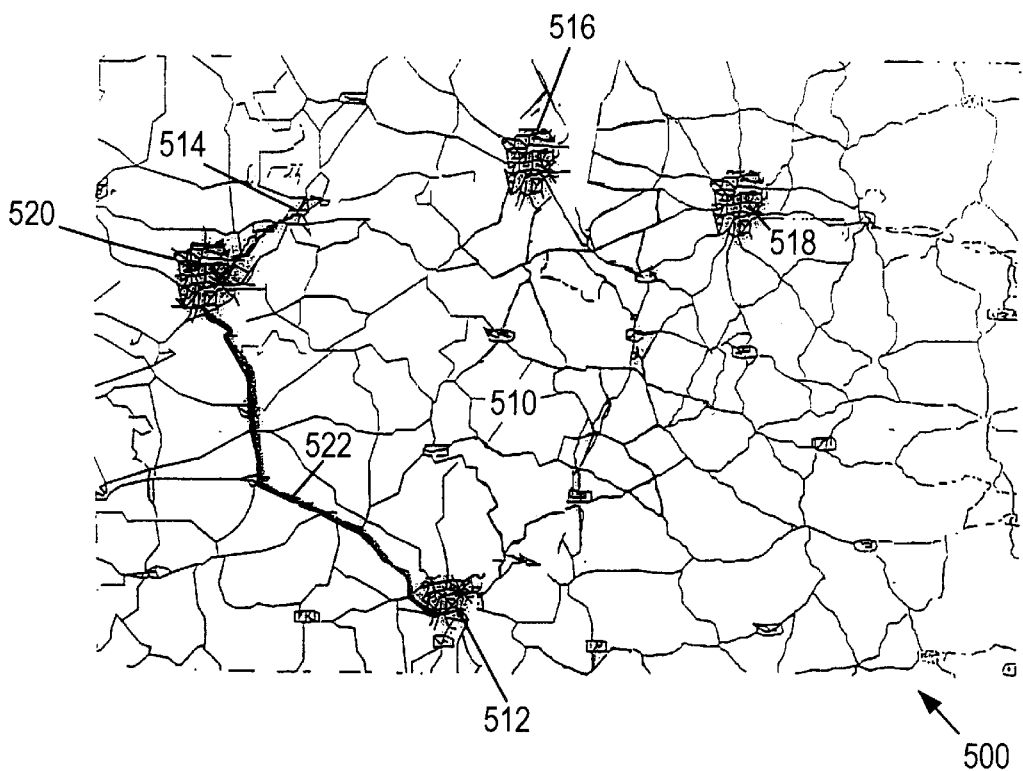
FIG. 26 shows a road map with a calculated route when only the departure point and a destination are specified.
Figure 27:
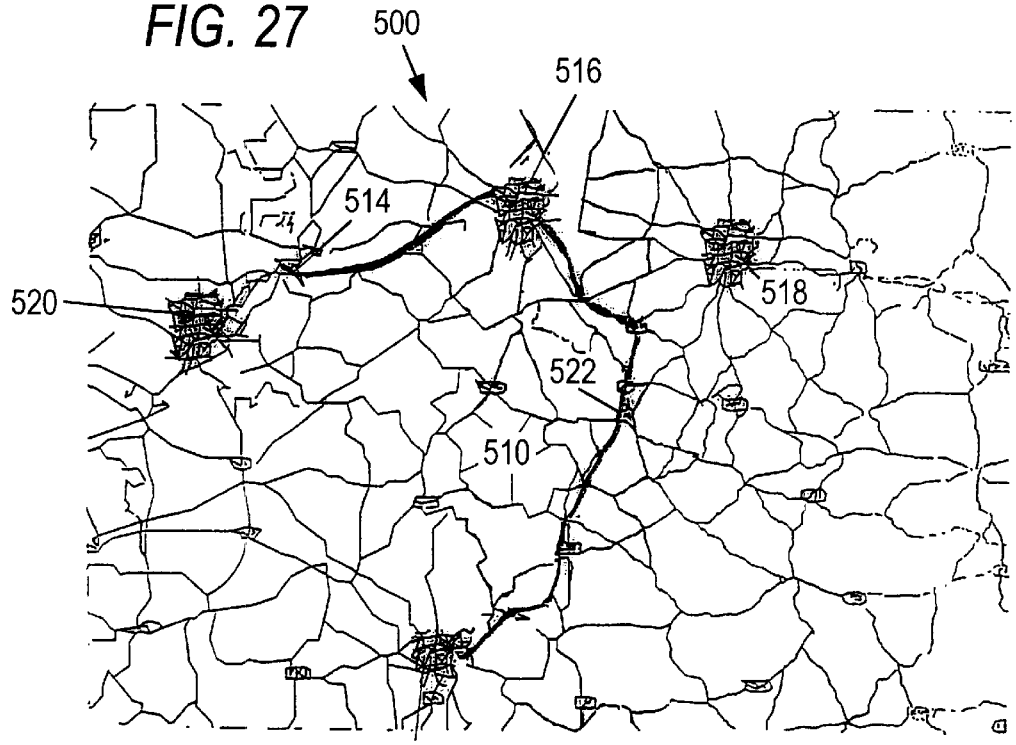
FIG. 27 and FIG. 27a show a road map with a calculated route when a departure point, a final destination and one intermediate destination in the form of a city are specified.
Figure 28A:
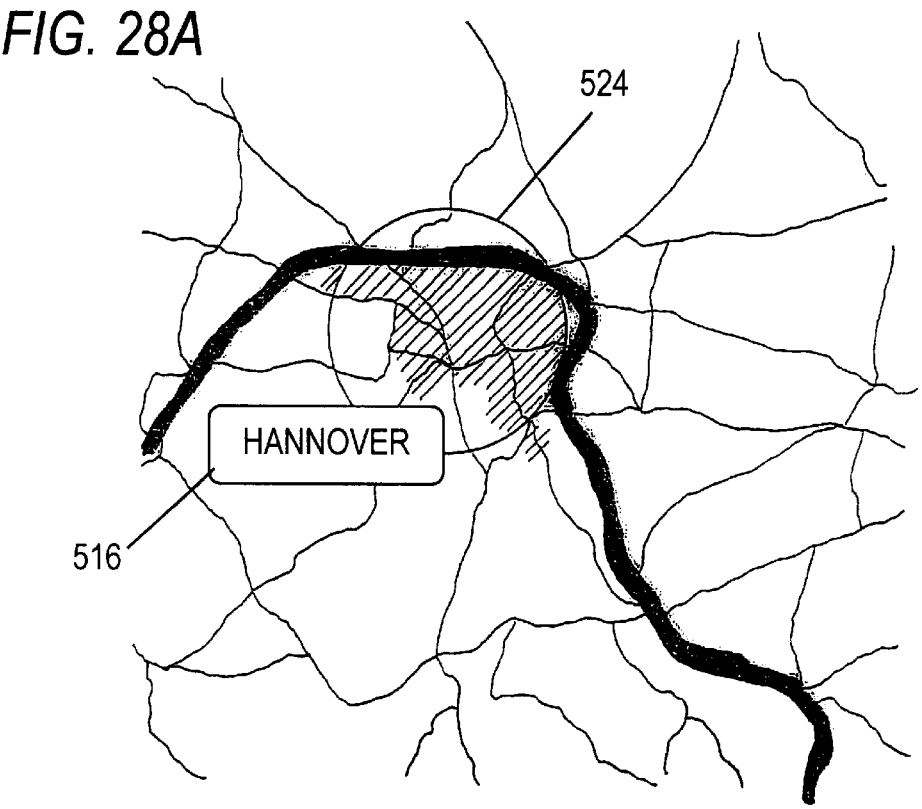
FIG. 28 and FIG. 28a show a road map with a calculated route when one departure point, one final destination and one intermediate destination in the form of a transition region according to the invention are specified.
Figure 28:
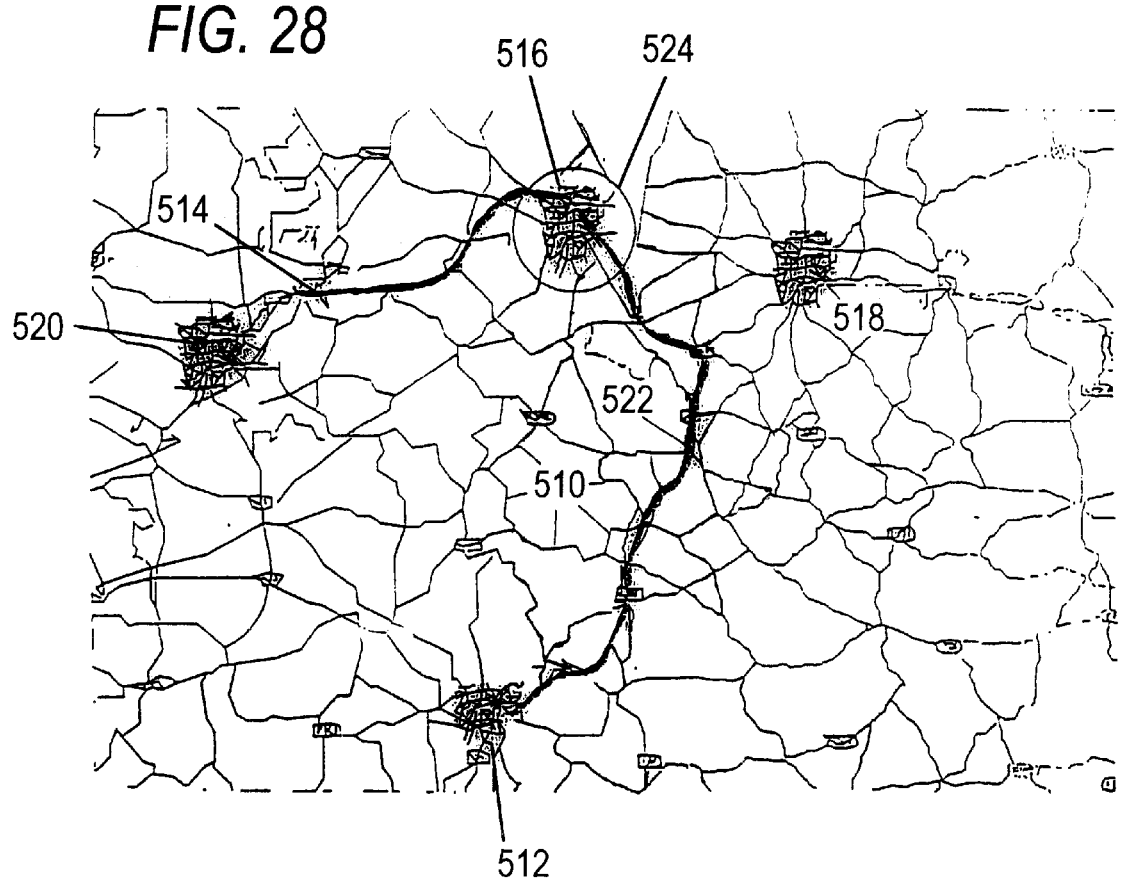

In the following, the method of the invention will be explained by comparison with a conventional route calculation as shown in FIGS. 26 to 28. Each of FIGS. 26 to 28 shows a road map 500 with roads 510 and cities 512 to 520. The represented road network, for example, corresponds to an actually existing road network with cities "Kassel" 512, "Minden" 514, "Hannover" 516, "Braunschweig" 518 and "Bielefeld" 520. Each of maps 500 contains besides roads 510 a calculated route 522 which is represented by a heavy line.

FIG. 26 shows a situation in which only the departure point "Kassel" 512 and the destination "Minden" 514 were specified for the route calculation. In other words, a "normal" route is involved here. The calculated route is 176 km long and requires an estimated travel time of 1 h 44 min. The route list contains the following: "City region Kassel, A44, A33, A2 and Minden surroundings".

If, however, a route via Hannover is wanted, then prior-art navigation methods and apparatus require that the intermediate destination "Hannover" 516 be specified besides the departure point "Kassel" 512 and the destination "Minden" 514 after which the route is calculated. This situation is shown in FIG. 27. Here, a first route from "Kassel" 512 to "Hannover" 516 is calculated. Then, a separate second route from "Hannover" 516 to "Minden" 514 is calculated after which the two routes are simply linked together. The first route is 165 km long with an estimated travel time of 1 h 36 min. The second route is 75 km long with an estimated travel time of 0 h 55 min. The overall route 522 is then 240 km long with an estimated travel time of 2 h 32 min. The route list contains the following entries: "City region Kassel, A7, Hannover (passage through city), A2, surroundings of Minden".

Figure 27A:
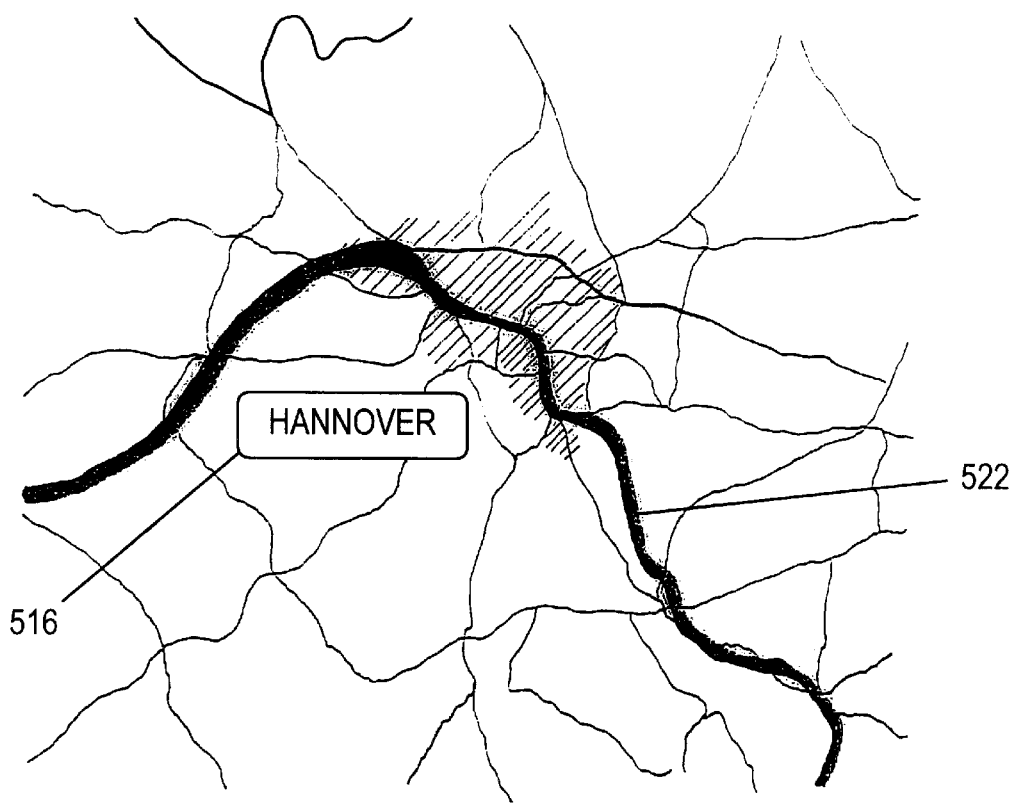

It is evident that by calculating two separate routes which are simply linked together, no optimization occurs in the region of the intersection of the two routes, namely at the intermediate destination "Hannover" 516. For clarification, FIGS. 27a and 28a show a region of the intermediate destination "Hannover" in additionally schematized and enlarged form. Route 522 leads directly through an inner region of the city (FIG. 27a) with an attendant negative effect on travel time. This is due to the fact that the navigation system does not calculate a real route with an intermediate destination, but merely assumes that in the first route calculation "Hannover" 516 represents the final destination.

This serious drawback is eliminated as described by the above-explained invention, and a true "route with an intermediate destination" is calculated, as can be seen in FIGS. 28 and 28a. Here. "Hannover" 516 is defined as transition region 524. The overall route 522 has a length of 245 km which while somewhat longer than the route according to FIG. 27 has a definitely shorter travel time of 2 h 17 min. The length of the stretch between "Kassel" 512 and "Hannover" 516 is 164 km with an estimated travel time of 1 h 26 min and the length of the stretch between "Hannover" 516 and "Minden" 514 is 81 km with an estimated travel time of 0 h 51 min. The following is entered into the route list: "City region Kassel", A7, AK Hannover East, A2, surroundings of Minden". Because, according to the invention, in the calculation of the overall route 522 the final destination, namely travel to "Minden" 514, is not lost from sight, the calculated route 522 contains in place of a passage through the inner region of the city of "Hannover" 516 a by-pass of the city region of "Hannover" 516. The result is the indicated time advantage.

A comparison of FIGS. 28 and 28a with FIGS. 27 and 27a clearly shows the difference between the invention and the conventional method for calculating the route with an intermediate destination. The conventional method as shown in FIG. 27 cannot take into consideration further travel from "Hannover" 516 to "Minden" 514 and, hence, selects a route into the city region of "Hannover" 516 as if "Hannover" 516 were the final destination. By contrast, the method of the invention selects in the transition region 524 of the intermediate destination "Hannover" 516 a route which is optimized in terms of further travel to "Minden" 514.

What is claimed is:

1. A method of calculating a route from a departure point to a final destination by means of a navigation device, said navigation device including a stored digital map, said digital map representing a real road network with nodes and segments having resistances, said method comprising the steps of:
   a) preselecting by a user of the navigation device a location and extent of at least one transition region of the real road network, through which the route to be calculated must pass, and defining by said user a position and size of at least one surface region on said digital map, said at least one surface region corresponding to said at least one transition region;
   b) preselecting a travel-through sequence of separate intermediate areas on said digital map by said user when said at least one surface region consists of a plurality of said separate intermediate areas;
   c) then optimizing the segments for said route by means of a route search algorithm executed in said navigation device to obtain optimized segments and storing the optimized segments in at least one route table in said navigation device, and
   d) minimizing an overall resistance of said route from the departure point to said final destination in said navigation device, with the proviso that said route must pass through said at least one surface region and through each of said separate intermediate areas when said at least one surface region consists of said separate intermediate areas.

2. The method as defined in claim 1, wherein said segments of said corresponding group present in said at least one surface region are assigned and stored in a transition region list of the navigation device, a first sectional segment optimization is executed starting from a destination segment corresponding to said final destination, an optimization result for the first sectional segment optimization is stored in a first sectional route table of the navigation device, and further sectional segment optimizations are executed in accordance with a total transition region number and further optimization results are stored in separate sectional route tables in said navigation device, and at an end of said first sectional segment optimization segments stored in an originally initialized and destination-initialized transition region list are updated with corresponding resistances from the first sectional route table, and, moreover, at a beginning of each of said sectional segment optimizations the current resistances of the segments of the transition region list are entered into an originally initialized sectional route table and, moreover, at the end of the first and up to a penultimate sectional segment optimization the resistances of the segments stored in a current transition region list are updated with the resistances of corresponding segments of a relevant sectional route table, and, after a last sectional segment optimization starting with a last sectional route table and up to corresponding segments of a relevant sectional route table, and, after a last sectional segment optimization starting with a last sectional route table and up to the first sectional route table, a route list is compiled from the aforesaid tables, so that the overall resistance of the route from the departure point through the at least one transition region to said final destination is minimized.

3. The method as defined in claim 2, wherein a compilation of the route list is performed so that, starting with the last sectional route table of the last sectional segment optimization, said segments are entered sequentially into the route list until in the last sectional route table no follower is defined for a corresponding segment and the method continues with said corresponding segment and with a next and additional sectional route table up to the first route table and a sequence in which the sectional route tables is processed is predetermined in the transition region list.

4. The method as defined in claim 2, further comprising storing in said transition region list a transition region description list and a transition region index table, and wherein the transition region index table contains an assignment of each of said at least one transition region to the transition region description list and the route tables, and the transition region description list contains ones of said segments with attendant ones of said resistances that are assigned to respective ones of said at least one transition region.

5. The method according to claim 4, wherein the final destination is entered into the transition region description list as a first entry with a resistance of zero.

6. The method according to claim 2, wherein all of said resistances of said segments are set equal to infinity and any stored followers are cancelled in an original initialization.

7. The method according to claim 2, wherein for destination initialization the resistances of the destination segment for said final destination are set equal to zero.

8. The method as defined in claim 1, wherein said at least one surface region on said digital map is in the form of a rectangle, a polygon, an ellipse or a circle about a prominent point.

9. The method as defined in claim 8, wherein said prominent point corresponds to a city, congested area or superhighway exit.

10. The method as defined in claim 1, wherein said at least one surface region is defined in spatially approximate or vague terms.

11. The method as defined in claim 1, further comprising taking into account effects on the real road network resulting from at least one of telecommunications and user-defined manipulations during the optimizing and minimizing.

12. The method as defined in claim 11, wherein said user-defined manipulations include the "traffic jam ahead" obstructions.

13. A navigation apparatus (400) for calculating a route from a departure point to a final destination based on a digital map stored in a memory device, said digital map representing a real road network with segments with resistances and nodes, wherein said navigation apparatus comprises a device (412, 418) for entering data defining a location and extent of at least one surface region on said digital map, said at least one surface region corresponding to at least one transition region of the real road network through which the route must pass, and an index memory (410) for storing properties of said at least one transition region and for storing a travel-through-sequence of separate intermediate areas on the digital map when said at least one surface region comprises said separate intermediate areas.

14. The navigation apparatus (400) as defined in claim 13, further comprising means for minimizing an overall resistance of said route from the departure point to said final destination, with said route constrained to pass through said at least one surface region, a navigation processor (401), a data storage device (402) comprising means for storing the digital map comprising the segments and nodes representing the real road network, a sensing device (404), a position-finding device (406), a route-searching device (408), an interface (412), a loudspeaker (414), a display (416) and an input device (418).

* * * * *